(12) United States Patent
Kim et al.

(10) Patent No.: US 10,310,638 B2
(45) Date of Patent: Jun. 4, 2019

(54) MOBILE TERMINAL DISPLAYING WRITING INFORMATION GENERATED BY PEN DEVICE BASED ON VOICE RECEIVED VIA MICROPHONE AND CONTROL METHOD THEREOF

(71) Applicant: LG ELECTRONICS INC., Seoul (KR)

(72) Inventors: Eunhye Kim, Seoul (KR); Taehoon Cho, Seoul (KR); Minkyoung Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 53 days.

(21) Appl. No.: 15/451,329

(22) Filed: Mar. 6, 2017

(65) Prior Publication Data
US 2018/0052529 A1    Feb. 22, 2018

(30) Foreign Application Priority Data
Aug. 22, 2016  (KR) .......................... 10-2016-0106226

(51) Int. Cl.
| | | |
|---|---|---|
| G09G 5/00 | (2006.01) | |
| G06F 3/038 | (2013.01) | |
| G06F 3/0354 | (2013.01) | |
| G06F 3/041 | (2006.01) | |
| G06F 3/0488 | (2013.01) | |

(52) U.S. Cl.
CPC .......... *G06F 3/038* (2013.01); *G06F 3/03545* (2013.01); *G06F 3/0416* (2013.01); *G06F 3/04883* (2013.01); *G06F 2203/04105* (2013.01); *G06F 2203/04106* (2013.01); *G06F 2203/04108* (2013.01); *G06F 2203/04807* (2013.01)

(58) Field of Classification Search
CPC .... G06F 3/03545; G06F 3/038; G06F 3/0416; G06F 3/04883; G06F 2203/04106; G06F 2203/04108; G06F 2203/04807; G06F 2203/04105
USPC ................................................ 345/173–179
See application file for complete search history.

(56) References Cited

U.S. PATENT DOCUMENTS

| | | | |
|---|---|---|---|
| 2014/0122490 A1* | 5/2014 | Black ...................... | G06F 3/038 707/737 |
| 2014/0125606 A1* | 5/2014 | Namkung ............. | G06F 1/1656 345/173 |
| 2014/0253521 A1* | 9/2014 | Hicks .................. | G06F 3/03545 345/179 |
| 2016/0147434 A1* | 5/2016 | Lee ....................... | G06F 17/242 715/838 |
| 2018/0024708 A1* | 1/2018 | Kim ...................... | G06F 17/241 715/268 |

\* cited by examiner

*Primary Examiner* — Jennifer T Nguyen
(74) *Attorney, Agent, or Firm* — Lee, Hong, Degerman, Kang & Waimey

(57) ABSTRACT

A mobile terminal includes: a display; a communication module configured to perform communication with a pen device having a first end and a second end; and a controller configured to: control the display and the communication module; recognize that the pen device operates in a first mode when the first end of the pen device is not in contact with the display for a predetermined time; and cause the display to display writing information when the pen device operates in the first mode, wherein the writing information is generated by the pen device on a surface other than a surface of the display.

20 Claims, 35 Drawing Sheets

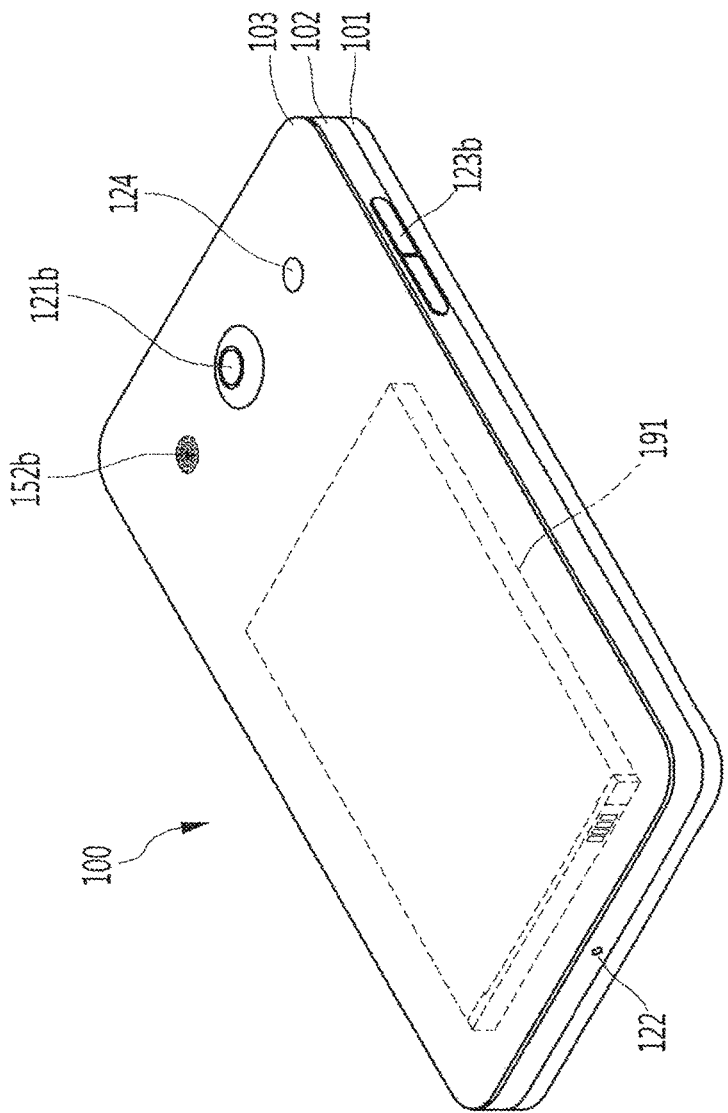

FIG. 7

Weak Convergence
$X_n, X : \mathbb{R}^k$- valued
Def $X_n \xrightarrow{d} X$
$\Leftrightarrow F_n(x) := P(X_n \leq x)$
$F(x) := P(X \leq x)$ thm  Skorohod's theorem.
Suppose that $X_n \xrightarrow{d} X$. Then, there exist $\{X_n^*\}$ and $X^*$ defined
On the same proloability sp. such that $X_n \xrightarrow{d} Xu, X^* \stackrel{d}{=} X$ e
$X_n^* \to X^*$ a.s.

thm  Contiuuous Mapping theorem for a.s Convergence.
$X_n \to X$ a.s., $F: \mathbb{R}^* \to \mathbb{R}$ s.t. $P(X \in C_1) = 1_n$
$\Rightarrow f(X_a) \xrightarrow{a.s.} f(X)$ (pf) $I = P(X \in C, X_n \to X \text{ as } n \to \infty)$
$\leq P(X \in C, f(X_n) \to f(x) \text{ a.s } n \to \infty)$
$\leq P(f(X_n) \to f(X) \text{ as } n \to \infty)$ $X도$  $a_n \to a \Rightarrow f(a_n) \to f(a)$
  if f is coati at a thm Almost everywhere convergence implies weak convergence
$X_n \to X$ a.s. $\Rightarrow X_n \xrightarrow{d} X$
(pf) $F_{ix}\ x \in C_F$ and consider $f(.) = 1_{[-\infty, x]}(.)$
$C_f = \mathbb{R} - \{x\} \Rightarrow P(X \in C_p) = P(X \neq x) = 1 - P(X = x) = 1$
$(\because) x \in C_F \Leftrightarrow P(X = x) = 0$ By the comtinuous mapping theorem for a.s. convergence.
$f(X_n) \to f(x)$ a.s
By DCT, $E f(X_n) = F_n(x) \to E f(X) = F(x)$

FIG. 12

The quick brown fox
jumps Over the lazy
dog
→
The quick brown fox    1201
jumps Over the lazy
dog

---

The quick brown fox
jumps Over the lazy
dog
→
The quick brown fox    1203
jumps Over the lazy
dog

---

The quick brown fox
jumps Over the lazy
dog
→
The quick brown fox    1205
jumps Over the lazy
dog

The quick brown fox
jumps Over the lazy
dog

⟶

The quickbrown fox
jumps Over the lazy
dog

1303

The quickbrown fox
jumps Over the lazy
dog

⟶

The quick brown fox
jumps Over the lazy
dog

FIG. 16
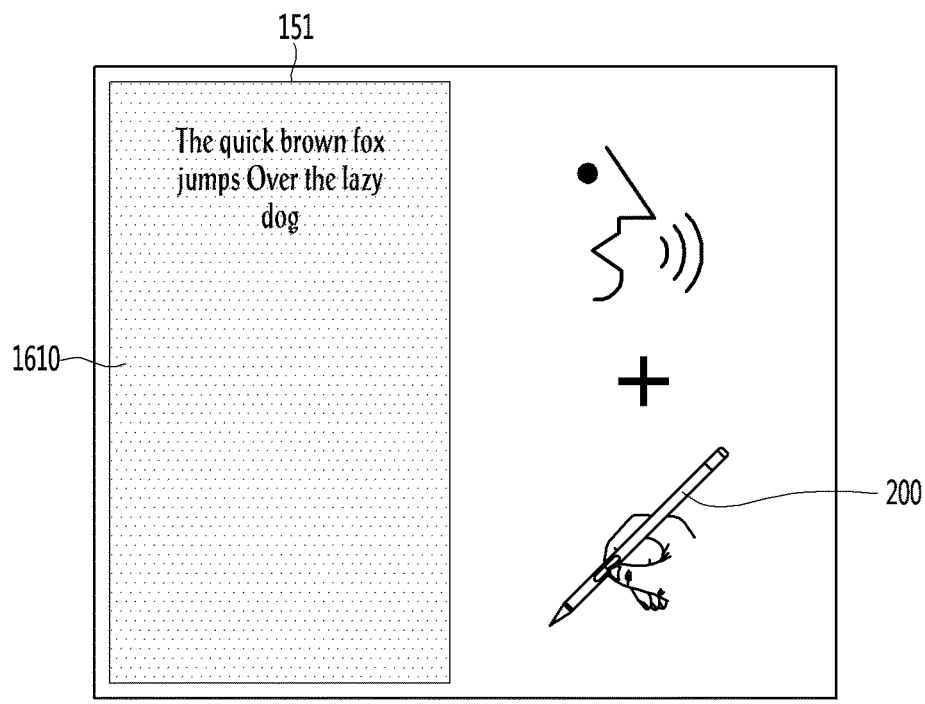
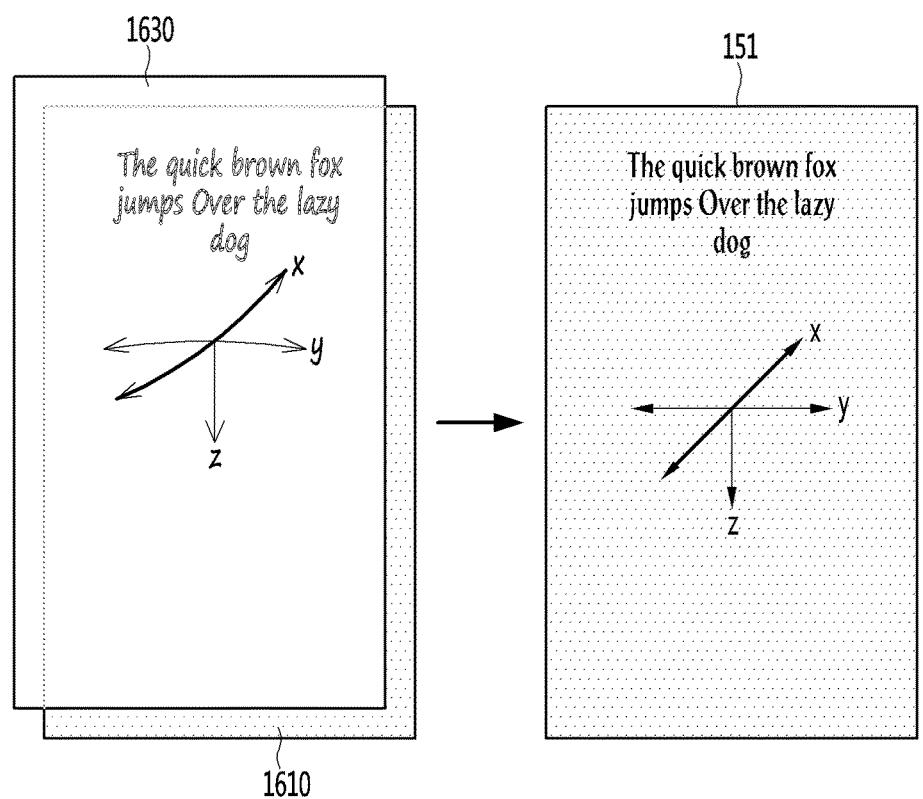

FIG. 33
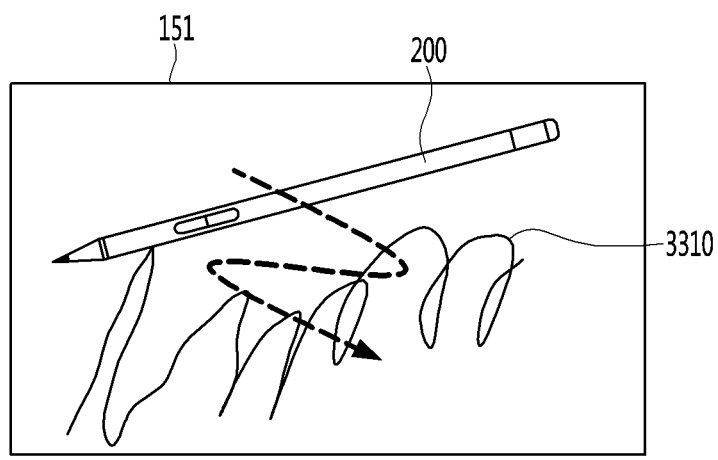
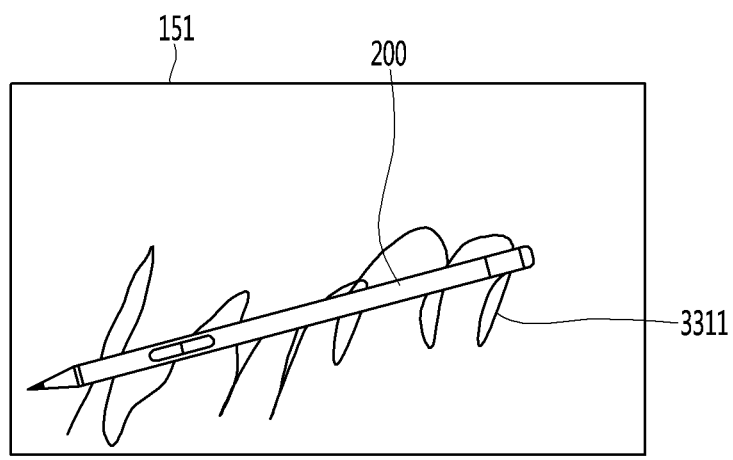

MOBILE TERMINAL DISPLAYING WRITING INFORMATION GENERATED BY PEN DEVICE BASED ON VOICE RECEIVED VIA MICROPHONE AND CONTROL METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2016-0106226 filed on Aug. 22, 2016, the contents of which are hereby incorporated by reference herein in its entirety.

BACKGROUND

The present disclosure relates to a mobile terminal, and more particularly, to a mobile terminal which can provide or edit a writing in linkage with a pen device.

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Efforts are ongoing to support and increase the functionality of mobile terminals. Such efforts include software and hardware improvements, as well as changes and improvements in the structural components.

In addition, the mobile terminal may display a writing created through a pend device.

Typically, a user could input a writing through a pen device on a display of a mobile terminal, but various demands of the user could not be satisfied.

SUMMARY

The present disclosure provides a mobile terminal which enables a pen device to perform a function except a writing function, if the pen device does not perform the writing function as a primary function.

Further, the present disclosure provides a mobile terminal which provides an optimal environment or function, based on a contact position between a pen device and the mobile terminal, and a degree, a manner, and an angle where a user grasps the pen device.

In one embodiment, a mobile terminal includes: a display; a communication module configured to perform communication with a pen device having a first end and a second end; and a controller configured to: control the display and the communication module; recognize that the pen device operates in a first mode when the first end of the pen device is not in contact with the display for a predetermined time; and cause the display to display writing information when the pen device operates in the first mode, wherein the writing information is generated by the pen device on a surface other than a surface of the display.

According to the present disclosure, if the pen device does not perform a writing function as a primary function, the pen device can perform a function except the writing function, so that a user can use the pen device for various purposes.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

FIGS. 1B and 1C are conceptual views of one example of the mobile terminal, viewed from different directions.

FIG. 7 is a view illustrating that an operation mode of the pen device may be changed depending on an angle made by the pen device and the mobile terminal according to an embodiment.

FIGS. 12 and 13 are views illustrating an example in which, if the pen device operates in the first mode, a guide corresponding to a repetitive action of the pen device is provided according to an embodiment.

FIG. 16 is a view illustrating an example in which a writing is corrected by detecting a situation in which it is difficult to create the writing through the pen device according to an embodiment.

FIG. 33 is a view illustrating an example in which, if one surface of the pen device is in contact with the display unit, the pen device operates in an eraser mode according to an embodiment.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that if an element is referred to as being "connected with" another element, the element can be connected with the other element or intervening elements may also be present. In contrast, if an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
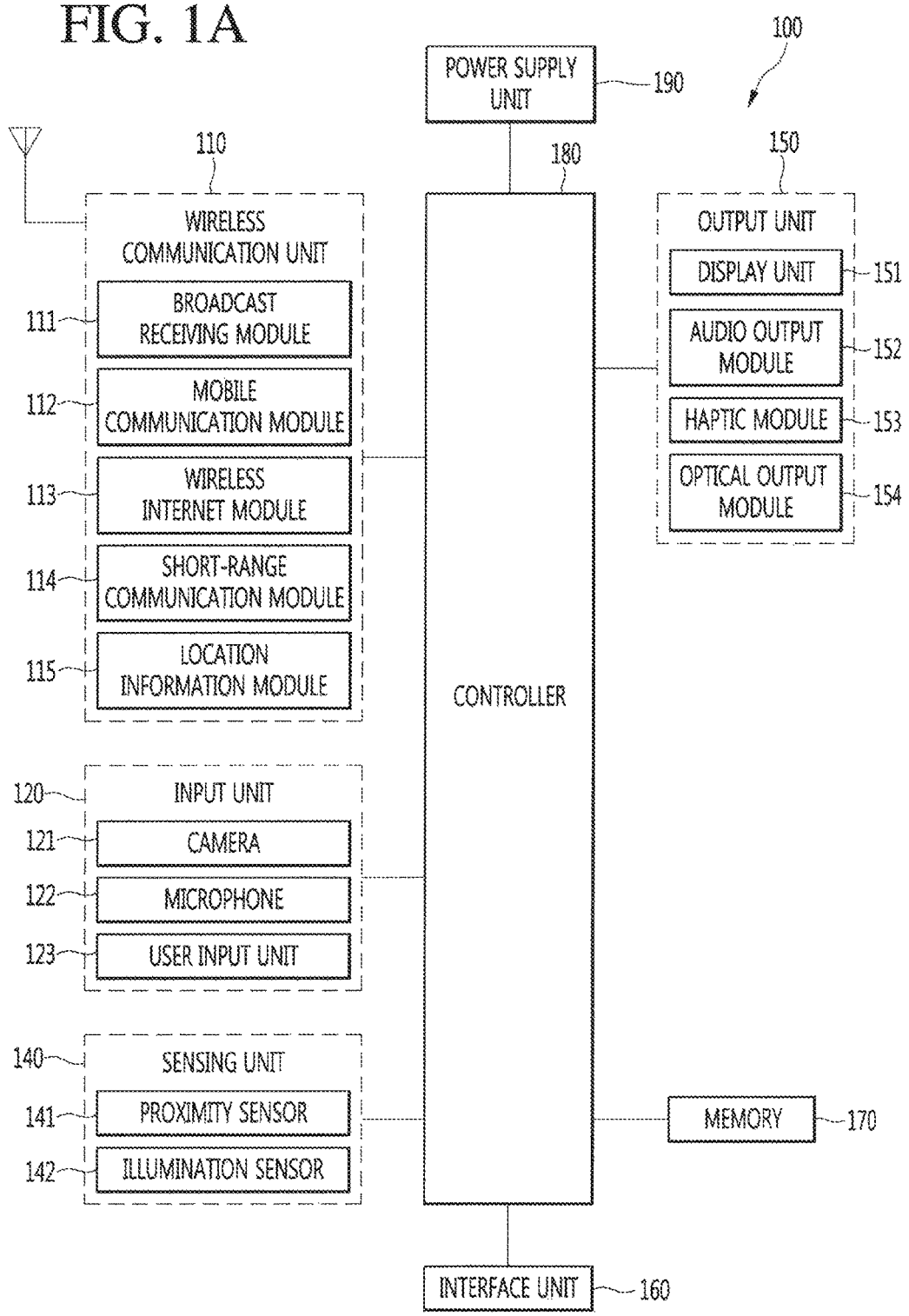
FIG. 1A is a block diagram of a mobile terminal in accordance with the present disclosure.
Figure 1B:
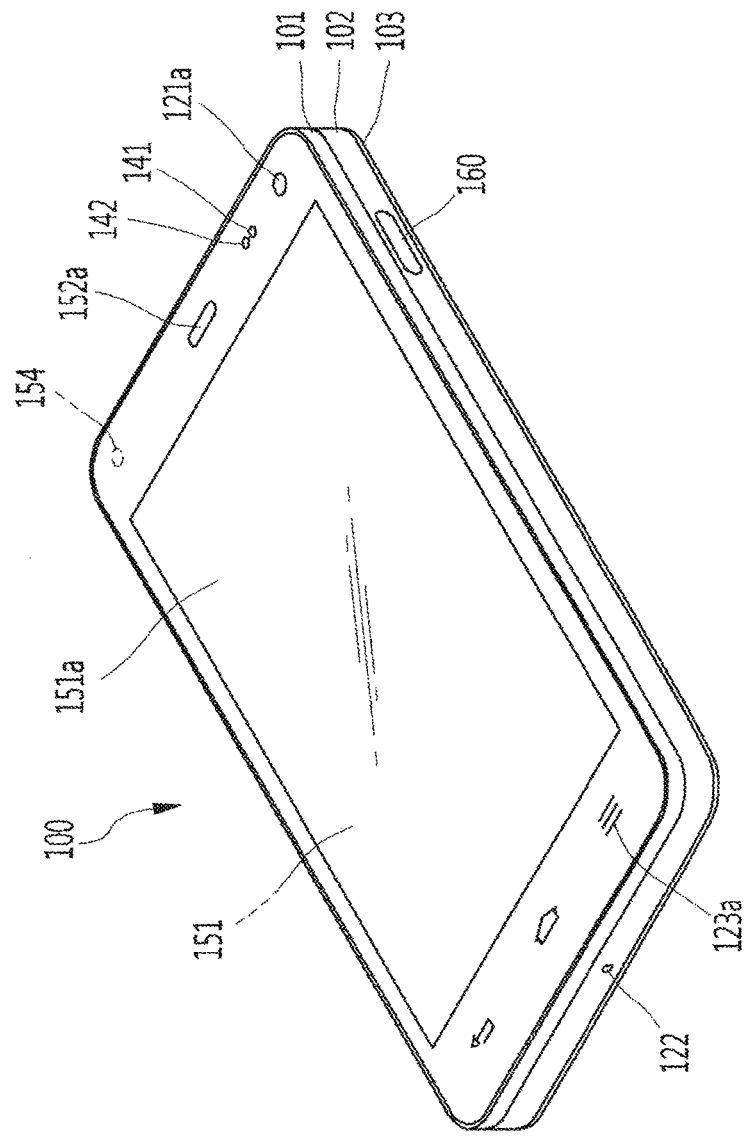

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and sends such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, if the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, if the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, if a call is received in the mobile terminal 100, the user may answer the call using the wearable device. Also, if a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, if the mobile terminal uses a GPS module, a position of the mobile terminal may be acquired using a signal sent from a GPS satellite. As another example, if the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. If the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

If a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

If the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications if a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supplies the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, if the rear cover 103 is detached from the rear case 102, the electronic components mounted to the rear case 102 are externally exposed.

As illustrated, if the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space if those cases are coupled.

The mobile terminal includes a display unit 151, a first and a second audio output modules 151a/151b, a proximity sensor 141, an illumination sensor 142, an optical output module 154, a first and a second cameras 121a/121b, first and second manipulation units 123a/123b, a microphone 122, interface unit 160 and the like.

It will be described for the mobile terminal as shown in FIGS. 1B and 1C. The display unit 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. If a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. If a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger if the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." If the second camera 121*b* is implemented as an array camera, images may be captured in various manners using the plurality of lenses and images with better qualities.

As shown in FIG. 1C, a flash 124 is shown adjacent to the second camera 121*b*. If an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. If the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC).

The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised if the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold if the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), UltraWideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

In a case where the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

If the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this case, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

Figure 2:
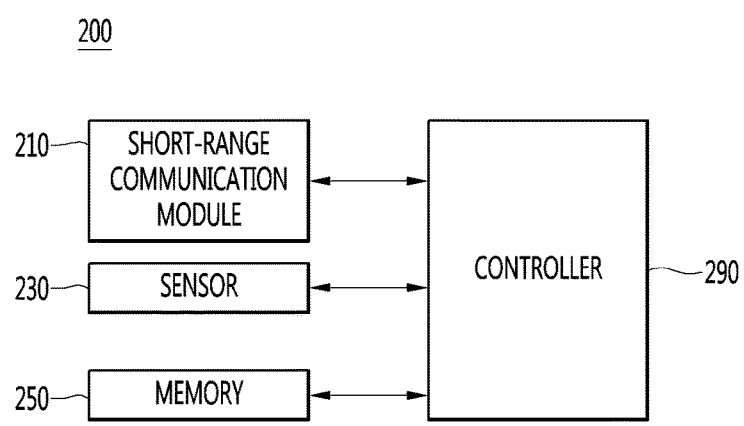
FIG. 2 is a block diagram illustrating a configuration of a pen device according an embodiment.

FIG. 2 is a block diagram illustrating a configuration of a pen device according an embodiment.

Referring to FIG. 2, the pen device 200 may include a short-range communication module 210, a sensor 230, a memory 250, and a controller 290.

The short-range communication module 210 may perform wireless communication with the short-range communication module 114 of the mobile terminal 100. The short-range communication module 210 may transmit sensing information acquired by the sensor 230 to the mobile terminal 100.

The sensor 230 may detect a contact between a nib of the pen device 200 and the display unit 151 of the mobile terminal 100.

The sensor 230 may sense information on an arrangement between the pen device 200 and the display unit 151 and a contact position between the pen device 200 and the display unit 151.

The sensor 230 may include at least one of a laser interferometer, a pressure sensor, a gyro sensor, an acceleration sensor, and a distance sensor.

The laser interferometer may acquire writing information create through the pen device 200 in an area except the display unit 151 of the mobile terminal 100. If light generated from a light source reach a detector along two paths, the laser interferometer may acquire distances of the two paths. The laser interferometer may acquire the writing information created in the area except the display unit 151 through the pen device 200, based on the acquired distances.

The acquired writing information may be transmitted to the mobile terminal 100 through the short-range communication module 210.

The laser interferometer may include a Michelson interferometer known in the art.

The sensor 230 may correspond to the configuration of the sensing unit 140 of the mobile terminal 100 shown in FIG. 1.

The memory 250 may store the writing information acquired through the laser interferometer.

The controller 290 may control overall operations of the pen device 200.

Figure 3:
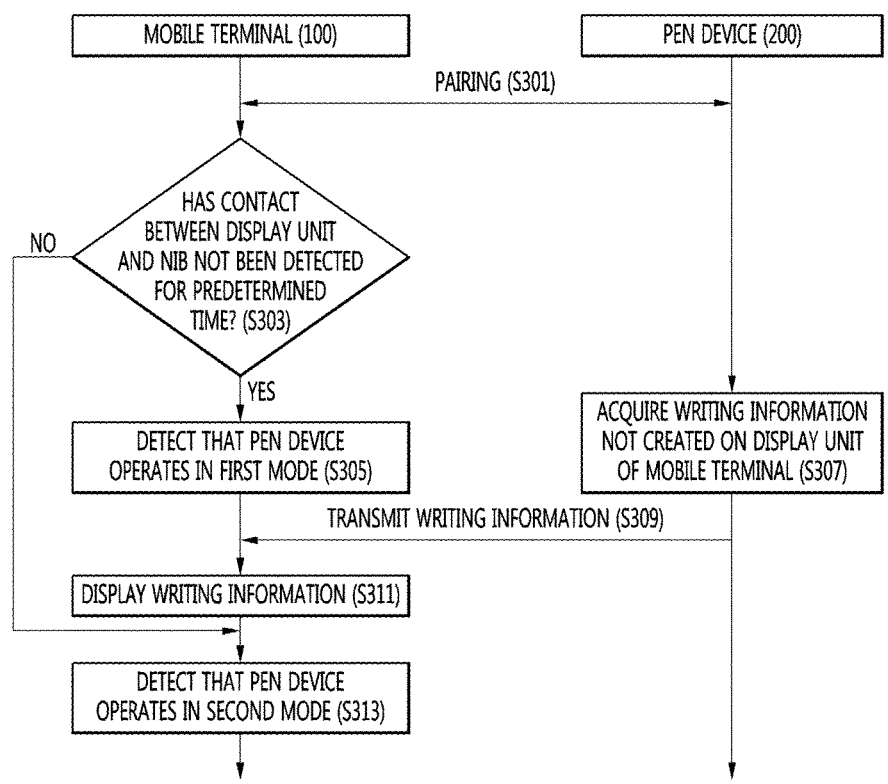
FIG. 3 is a ladder diagram illustrating an operating method between the mobile terminal and the pen device according to an embodiment.

FIG. 3 is a ladder diagram illustrating an operating method between the mobile terminal and the pen device according to an embodiment.

The mobile terminal 100 and the pen device 200 are paired with each other (S301). The mobile terminal 100 and the pen device 200 may be connected to each other through the short-range communication module 114 of the mobile terminal 100 and the short-range communication module 210 of the pen device 200.

In an embodiment, the mobile terminal 100 and the pen device 200 may be connected through Bluetooth protocol. In this case, each of the short-range communication module 114 of the mobile terminal 100 and the short-range communication module 210 of the pen device 200 may include a Bluetooth module.

The controller 180 of the mobile terminal 100 checks whether a contact between the display unit 151 and the nib of the pen device 200 has not been detected for a predetermined time (S303).

In an embodiment, the controller 180 may detect a contact between the display unit 151 and the nib of the pen device 200 through a touch sensor provided in the mobile terminal 100. The touch sensor may detect a contact between the display unit 151 and the nib of the pen device 200 through any one of a resistive scheme and a capacitive scheme. The display unit 151 may form a mutual layer structure with the touch sensor or may be integrally formed with the touch sensor, thereby implementing a touch screen.

The controller 180 may determine, through the touch sensor, whether the contact between the display unit 151 and the nib has not been detected for the predetermined time.

If the contact between the display unit 151 and the nib is not detected for the predetermined time, the controller 180 detects that the pen device 200 operates in a first mode (S305).

In an embodiment, an operation mode of the pen device 200 may include the first mode and a second mode.

The first mode may be a mode in which a writing is not input through the nib on the display unit 151 for the predetermined time or more. In user viewpoint, the first mode may indicate a state in which a user does not create a writing on the display unit 151 of the mobile terminal 100 for the predetermined time or more.

The first mode may be referred to as an idle mode to indicate that a writing function as a primary function of the pen device 200 has not been performed. The first mode may be a mode for performing operations except the writing function.

The second mode may be a mode in which a writing is input through the nib of the pen device 200 on the display unit 151 of the mobile terminal 100 within the predetermined time. That is, the second mode may be a mode in which the writing function at the primary function of the pen device 200 is performed.

If the pen device 200 operates in the first mode, the controller 290 of the pen device 200 acquires, through the sensor 230, writing information not created on the display unit 151 of the mobile terminal 100 (S307), and transmits the acquired writing information to the mobile terminal 100 (S309).

In an embodiment, the controller 290 of the pen device 200 may acquire writing information created in an area except a screen of the display unit 151 of the mobile terminal 100.

The area except the screen of the display unit 151 of the mobile terminal 100 may be a display or surface of another mobile terminal.

The controller 290 of the pen device 200 may acquire, through the sensor 230 provided in the pen device 200, writing information created in an area except the display unit 151 of the mobile terminal 100.

The controller 180 of the mobile terminal 100 displays the writing information received from the pen device 200 on the display unit 151 (S311).

Meanwhile, if a contact between the display unit 151 and the nib is detected within the predetermined time, the controller 180 of the mobile terminal 100 detects that the pen device 200 operates in the second mode (S313).

Steps S301 to S313 will be described with reference to the accompanying drawings.

Figure 4:
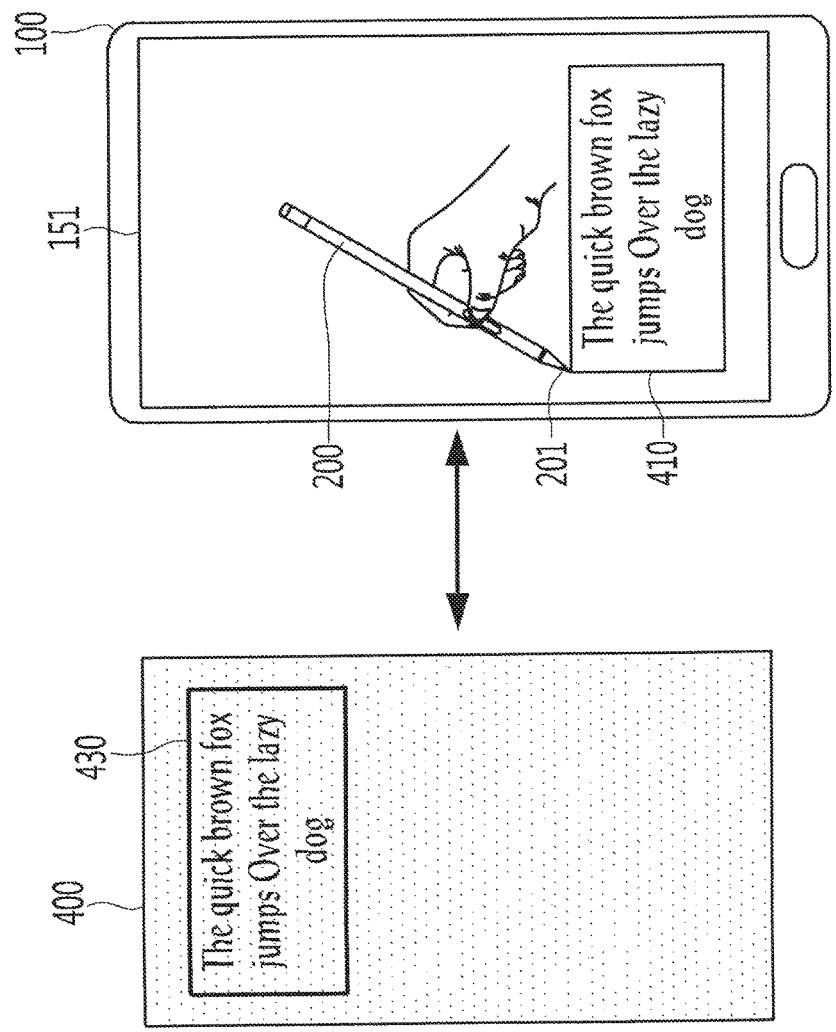
FIGS. 4 to 6 are views illustrating an example in which, if the pen device operates in a first mode, the mobile terminal displays writing information created in an area except a display of the mobile terminal according to various embodiments.
Figure 5:
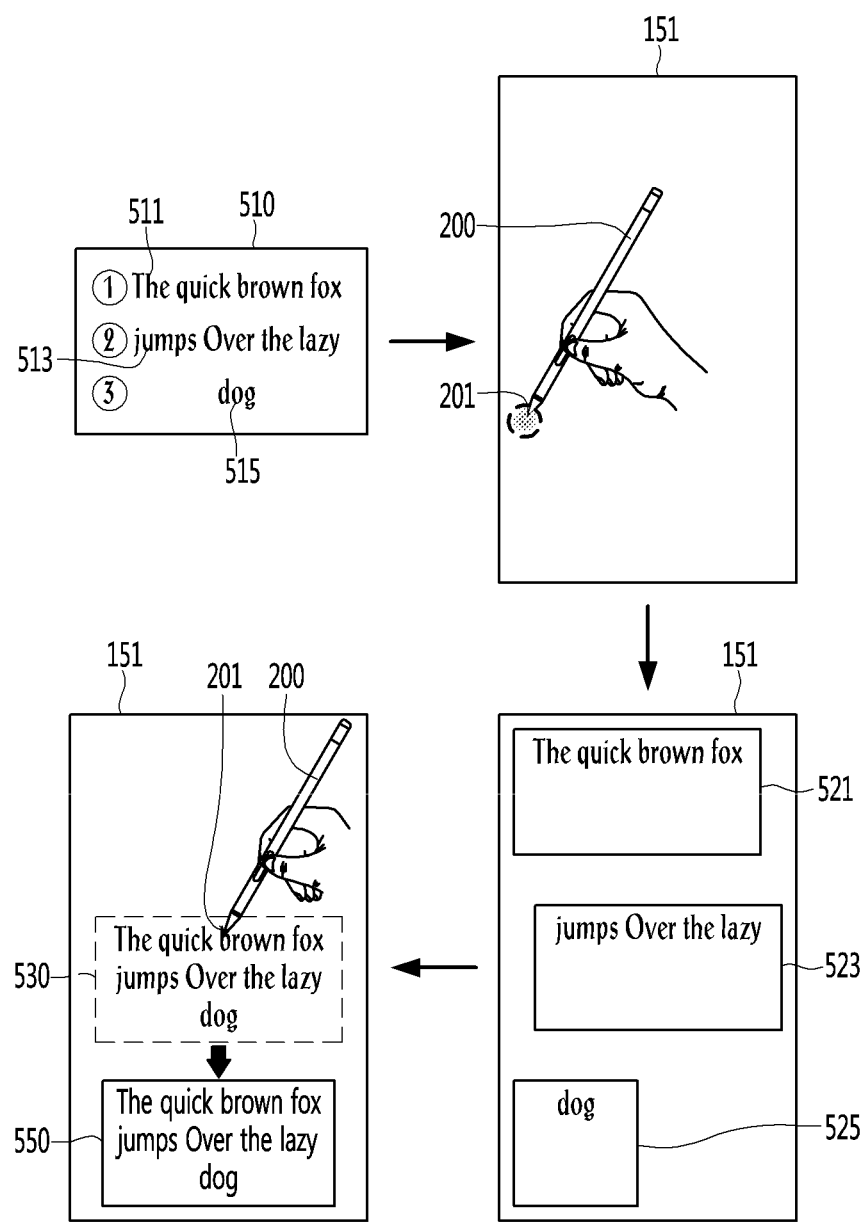
Figure 6:
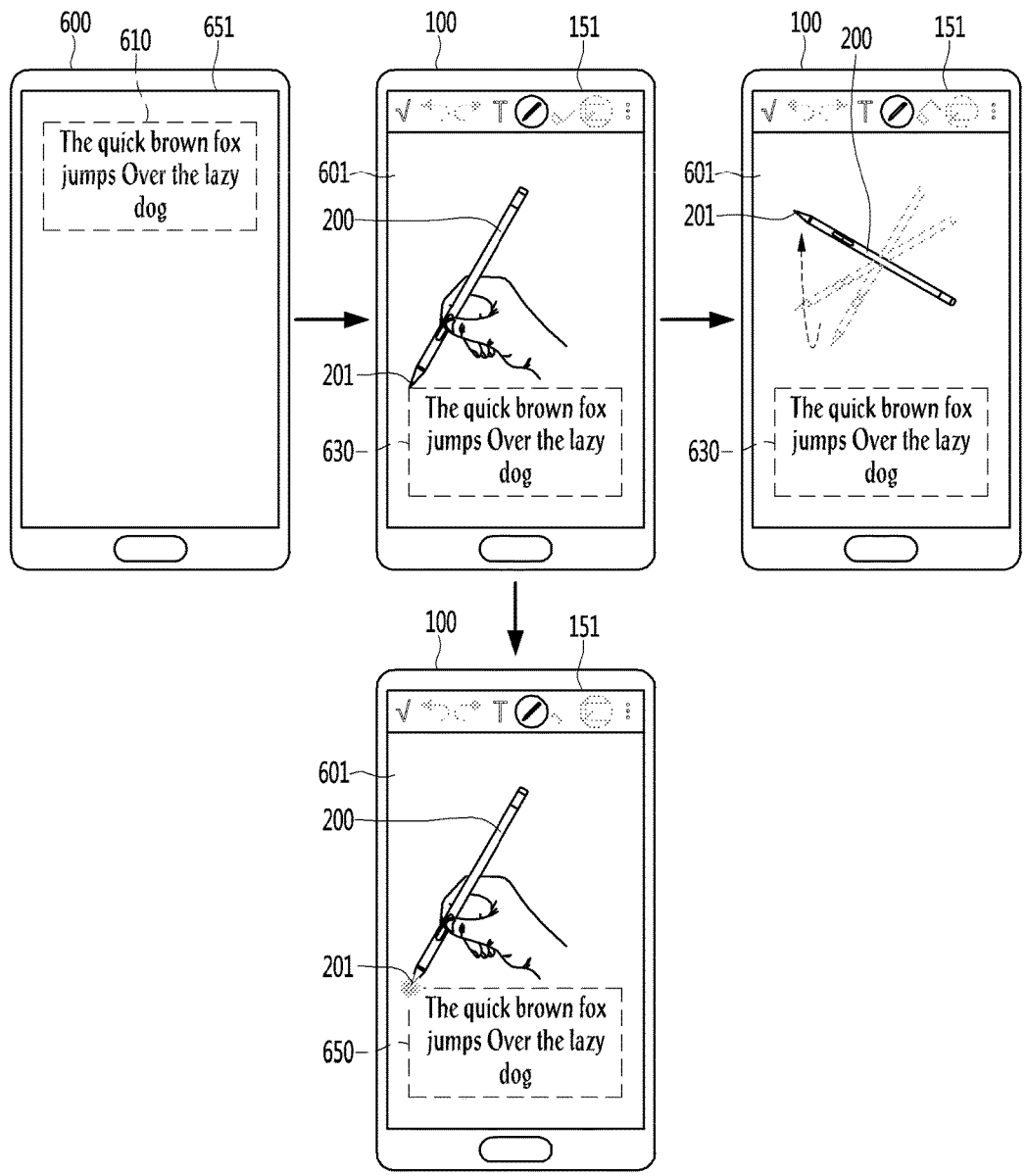

FIGS. 4 to 6 are views illustrating an example in which, if the pen device operates in a first mode, the mobile terminal displays writing information created in an area except a display of the mobile terminal according to various embodiments.

Referring to FIG. 4, if a nip 201 of the pen device 200 is not in contact with the display unit 151 for a predetermined time, the controller 180 of the mobile terminal 100 may detect that the pen device 200 operates in the first mode.

In an embodiment, the controller 180 may turn off power of the display unit 151 as the pen device 200 operates in the first mode.

In another embodiment, the controller 180 may change the screen of the display unit 151 to a black screen as the pen device 200 operates in the first mode.

The pen device 200 may acquire writing information 410 created on a surface 400 through the nip 201. The sensor 230 of the pen device 200 may detect the writing information 410 created on the surface 400 through the nip 201.

The pen device 200 may transmit the created writing information to the short-range communication module 114 of the mobile terminal 100 through the short-range communication module 210.

The mobile terminal 100 may display processed writing information 430 on the display unit 151, based on the writing information 410 received from the pen device 200. The processed writing information 430 may be displayed on black screen of the display unit 151. The processed writing information 430 may be information in a state in which the writing information 410 received from the pen device 200 is processed. For example, the processed writing information 430 may be information in a state in which a color, writing style, or the like of the received writing information 410 is changed.

The mobile terminal 100 can provide writing information created through the pen device 200 in an area except the display unit 151. That is, a user can easily store and utilize even writing information created in an area except the limited area such as the display unit 151 of the mobile terminal 100.

Next, FIG. 5 will be described.

Referring to FIG. 5, there is illustrated writing information 510 created through the pen device 200 in an area except the display unit 151 of the mobile terminal 100. The writing information 510 may include a first line 511, a second line 513, and a third line 515.

The pen device 200 may acquire the writing information 510 in the state in which the pen device 200 operates in the first mode.

The controller 180 of the mobile terminal 100 may detect that the nib 201 of the pen device 200 is in contact with the display unit 151. The display unit 151 may have a black screen as the power of the display unit 151 is turned off.

If it is determined that the nib 201 is in contact with the display unit 151, the controller 180 may display, in a post-it form, the writing information 510 created in the area except the display unit 151. If the nib 201 is in contact with the display unit 151, the controller 180 may receive the writing information 510 from the pen device 200. Simultaneously, the mobile terminal 100 may execute a memo application through which a memo is available.

The displayed writing information 510 may be processed to be displayed on the display unit 151. Specifically, the first line 511 may be displayed in a first post-it area 521, and the second line 513 may be displayed in a second post-it area 523, and the third line 515 may be displayed in a third post-it area 525.

Meanwhile, if the nib 201 is again in contact with the display unit 151, the writing information in the post-it form may be converted into coupled writing information 530. In this case, the controller 180 may detect that the pen device 200 operates in the second mode.

If the coupled writing information 530 is selected, the controller 180 may convert the writing information 530 into text information 550. The text information 550 may be information in a state in which a specific writing style is reflected to the writing information 530.

Next, FIG. 6 will be described.

In FIG. 6, it is assumed that the pen device 200 operates in the first mode.

Referring to FIG. 6, the pen device 200 may acquire writing information 610 created on a display unit 651 of another mobile terminal 600 instead of the display unit 151 of the mobile terminal 100. The acquired writing information 610 may be transmitted to the mobile terminal 100.

The mobile terminal 100 may display, on the display unit 151, an execution window 601 of the memo application as the memo application is executed. The mobile terminal 100 may display, on the display unit 151, processed writing information 630 based on the writing information 610 received from the pen device 200.

The mobile terminal 100 may display the processed writing information 630 in a speech bubble form. If the nib 201 is in contact with the display unit 151, the controller 180 of the mobile terminal 100 may display the processed writing information.

In this state, if the nib 201 is not in contact with the display unit 151, the controller 180 may delete the processed writing information 630.

As another example, if the nib 201 is in contact with the display unit 151 with a predetermined intensity for a predetermined time, the controller 180 may convert the processed writing information 630 into text information 650.

According to another embodiment, the operation mode of the pen device 200 may diversified based on a position relationship between the pen device 200 and the mobile device 100.

FIG. 7 is a view illustrating that the operation mode of the pen device may be changed depending on an angle made by the pen device and the mobile terminal according to an embodiment.

Referring to FIG. 7, the display unit 151 of the mobile terminal 100 displays a writing created through the pen device 200. The pen device 200 operates in the second mode. In this state, the controller 180 of the mobile terminal 100 may detect that a tip 203 of the device 200 is in contact with the display unit 151.

In an embodiment, if the tip 203 of the pen device 200 is in contact with the display unit 151, the controller 180 may detect that the operation mode of the pen device 200 has been changed from the second mode to the first mode.

In another embodiment, if the tip 203 of the pen device 200 is in contact with the display unit 151, and the nib 201 is not in contact with the display unit 151 for a predetermined time, the controller 180 may detect that the operation mode of the pen device 200 has been changed from the second mode to the first mode.

In addition, if the tip 203 of the pen device 200 is in contact with the display unit 151, the controller 180 may acquire an angle made by the pen device 200 and the display unit 151. A gyro senor and an angle sensor, which are provided in the pen device 200, may measure an angle made by the tip 203 and the display unit 151 and transmit the measured angle to the mobile terminal 100.

In an embodiment, if the measured angle is within a first angle range, the controller 180 may detect that the pen device 200 operates in a memorization write mode. The memorization write mode may be a mode in which a portion of a writing displayed on the display unit 151 is covered through the tip 203 of the pen device 200. The memorization write mode may be a mode included in the first mode.

The first angle range may be a range of 70 to 90 degrees, but this is merely an example.

In an embodiment, if the measured angle is within a second angle range, the controller 180 may detect that the pen device 200 operates in an eraser mode. The eraser mode may be a mode in which a writing displayed on the display unit 151 is erased through the tip 203 of the pen device 200. The eraser mode may also be a mode included in the first mode.

The second angle range may be a range of 0 to 70 degrees.

Figure 8:
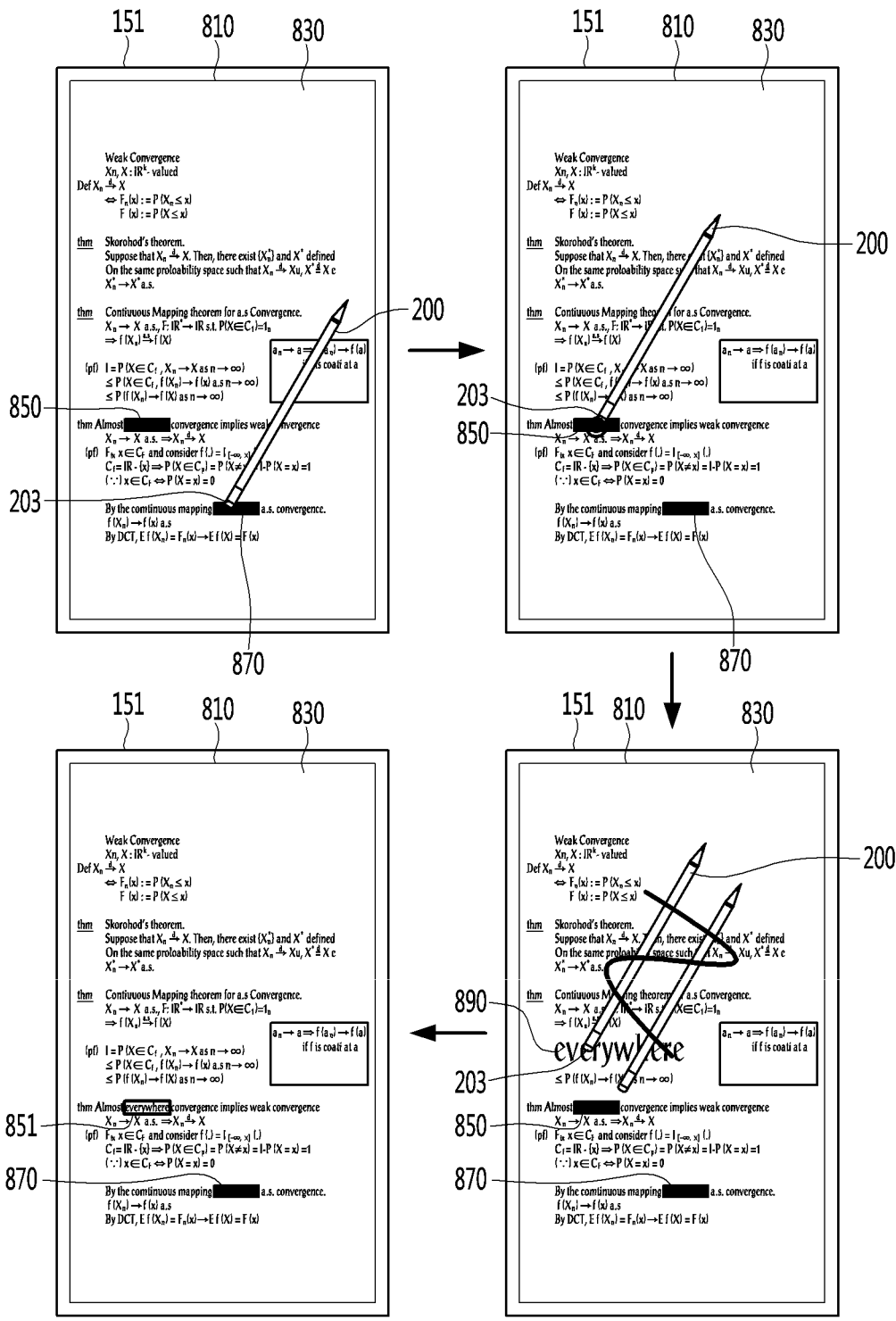
FIG. 8 is a view illustrating an example in which, if the pen device operates in a memorization write mode, a writing is utilized according to an embodiment.

FIG. 8 is a view illustrating an example in which, if the pen device operates in the memorization write mode, a writing is utilized according to an embodiment.

Referring to FIG. 8, the display unit 151 of the mobile terminal 100 may display a writing window 830 including a writing created through the pen device 200. In this state, if it is detected that the pen device 200 operates in the memorization write mode, the controller 180 may produce a transparent layer 810. The transparent layer 810 is a layer separately from the writing window 830, and may be a layer for processing a portion of the writing as a black box.

If portions of the writing are touched through the tip 203 of the pen device 200, the controller 180 may display black boxes 850 and 870 at the touched portions. The black boxes 850 and 870 may be displayed on the transparent layer 810.

In this state, if it is detected that the black box 850 is touched through the tip 203 for a predetermined time, the controller 180 may detect that the pen device 200 operates in a writing check mode that is a state in which the portion of the writing, covered by the black box 850, can be checked.

The controller 180 may recognize a writing 890 created through the tip 203 of the pen device 200. If the recognized writing 890 corresponds to the writing covered by the black box 850, the controller 180 may delete the black box 850. If the recognized writing 890 does not correspond to the writing covered by the black box 850, the controller 180 may continuously display the black box 850.

Next, an embodiment in which, if the pen device 200 operates in the first mode (idle mode), an attribute of a writing window is changed based on a user pattern will be described.

Figure 9:
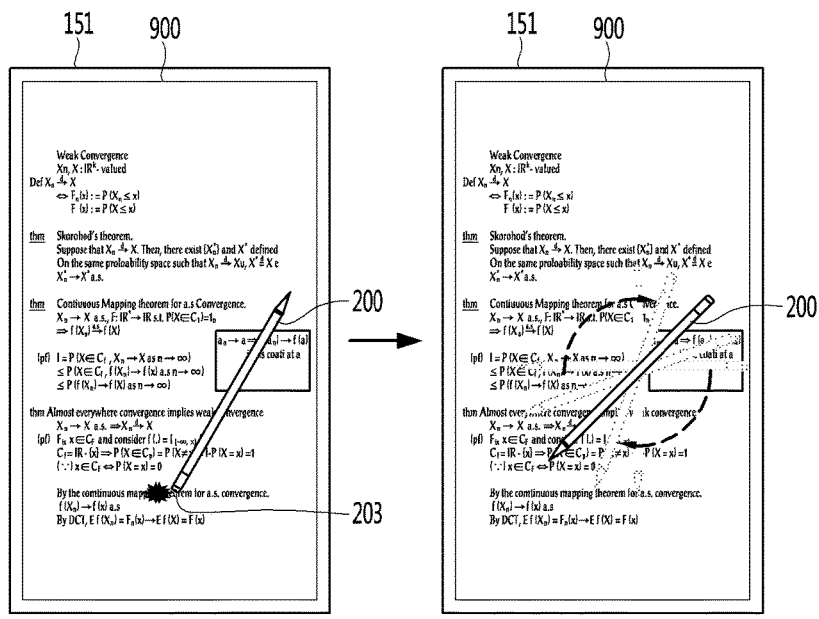
FIG. 9 is a view illustrating an example in which, if the pen device operates in the first mode (idle mode), an attribute of a writing window is changed based on a user pattern according to an embodiment.

FIG. 9 is a view illustrating an example in which, if the pen device operates in the first mode (idle mode), an attribute of a writing window is changed based on a user pattern according to an embodiment.

Referring to FIG. 9, if the pen device 200 operates in the second mode, a writing window 900 including a created writing may be displayed through the display unit 151 of the mobile terminal 100. In this state, the controller 180 may detect that the nib 201 of the pen device 200 is not in contact with the display unit 151 for a predetermined time. Accordingly, the controller 180 can detect that the pen device 200 operates in the first mode.

The controller 180 may change an attribute of the writing window 900, based on a use pattern of the user. For example, if the pen device 200 operates in the first mode, the controller 180 may detect that the tip 203 of the pen device 200 is periodically in contact with the display unit 151. In this case, the controller 180 may recognize a use pattern of a first user and change an attribute of the writing window 900, corresponding to the use pattern of the first user.

The attribute of the writing window 900 may include a color of the writing window 900, a color of a writing, a paper type of the writing window 900, and the like.

As another example, if the pen device 200 operates in the first mode, the controller 180 may detect that the pen device 200 is periodically rotated. In this case, the controller 180 may recognize a use pattern of a second user and change the attribute of the writing window 900, corresponding to the use pattern of the second user.

Next, an embodiment in which, if the pen device 200 operates in the first mode (idle mode), a writing is edited as an action of the pen device 200 is detected will be described.

Figure 10:
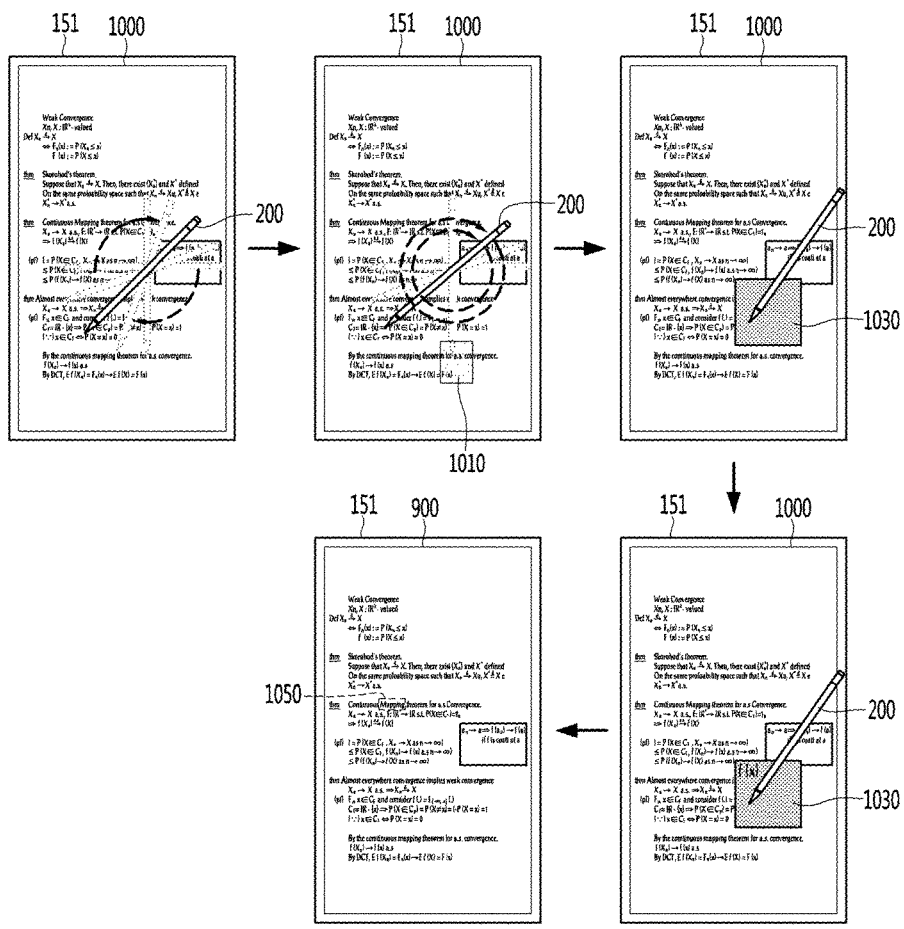
FIG. 10 is a view illustrating an example in which, if the pen device operates in the first mode (idle mode), a writing is edited as an action of the pen device is detected according to an embodiment.

FIG. 10 is a view illustrating an example in which, if the pen device operates in the first mode (idle mode), a writing is edited as an action of the pen device is detected according to an embodiment.

In FIG. 10, it is assumed that the pen device 200 operates in the first mode.

If the pen device 200 is rotated once, the controller 180 may store a writing window 1000 displayed on the display unit 151. The controller 180 may receive rotation information of the pen device 200 from the pen device 200.

The pen device 200 may detect a number of rotation times of the pen device 200 through the gyro sensor or acceleration sensor and transmit the detected number of rotation times to the mobile terminal 100.

If the pen device 200 is rotated three times or more, the controller 180 may display a transparent post-it item 1010 for creating an additional comment. The post-it item 1010 may be moved based on movement of the nib 201.

If an empty area of the writing window 1000 is selected through the nib 201, a post-it item 1030 may be displayed on the writing window 1000. The user may create an additional writing on the post-it item 1030.

Meanwhile, if a specific handwriting included in the writing window 1000 is selected through the transparent post-it item 1010 and the nib 201, the controller 180 may allow the selected handwriting 1050 to be highlighted. That is, the selected handwriting may be displayed such that a fluorescent effect is reflected thereto.

Figure 11:
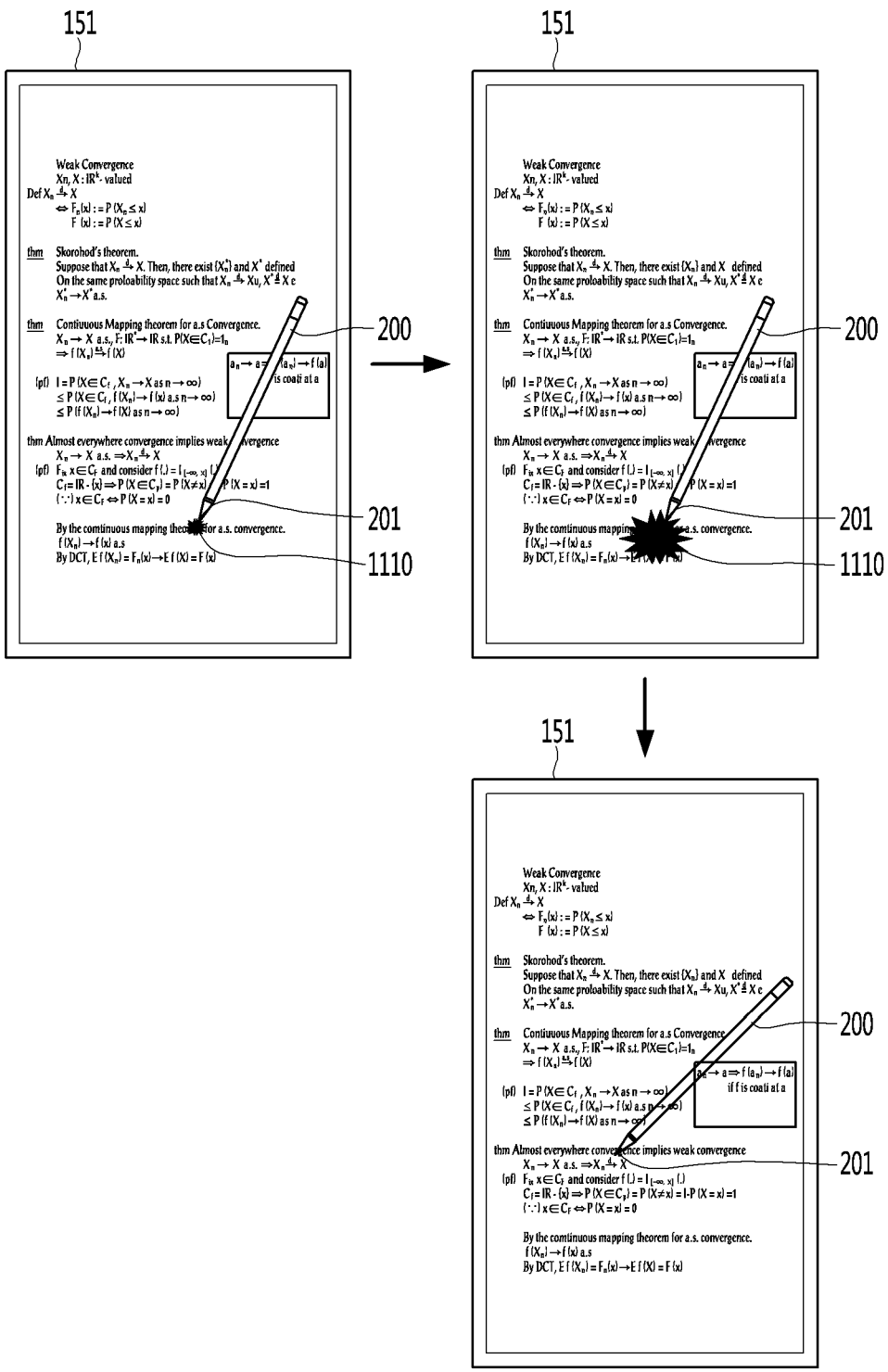
FIG. 11 is a view illustrating an example in which, if the pen device operates in the first mode, a visual feedback is provided according to an embodiment.

FIG. 11 is a view illustrating an example in which, if the pen device operates in the first mode, a visual feedback is provided according to an embodiment.

Referring to FIG. 11, the pen device 200 operates in the first mode. In this state, if the nib 201 is in contact with the display unit 151 for a predetermined time, a visual feedback 1110 where ink spreads may be displayed. As the time for which the nib 201 is in contact with the display unit 151 increases, the visual feedback 1110 may also increase.

If the nib 201 is not in contact with the display unit 151, the visual feedback 1110 may disappear.

FIGS. 12 and 13 are views illustrating an example in which, if the pen device operates in the first mode, a guide corresponding to a repetitive action of the pen device is provided according to an embodiment.

Referring to FIG. 12, the pen device 200 operates in the first mode. In this state, if a pattern is repeated a predetermined number of times with respect to a specific word (quick) of a writing displayed on the display unit 151, a guide corresponding to the pattern may be provided.

For example, if a circle is created three times or more on a specific word through nib of the pen device 200, the controller 180 may display a circle guide 1201 on the specific word.

If a quadrangle is created three times or more on a specific word through the nib of the pen device 200, the controller 180 may display a quadrangle guide 1203 on the specific word.

If an underline is drawn three times or more on a specific word through the nib of the pen device 200, the controller 180 may display an underline guide 1205 on the specific word.

Referring to FIG. 13, if a correction mark representing correction is created between words, the controller 180 may perform a correction function corresponding to the correction mark. For example, if a connecting correction mark 1301 is input, the controller 180 may connect between words.

In addition, if a spacing correction mark 1303 is input, the controller 180 may space a distance between words.

Figure 14:
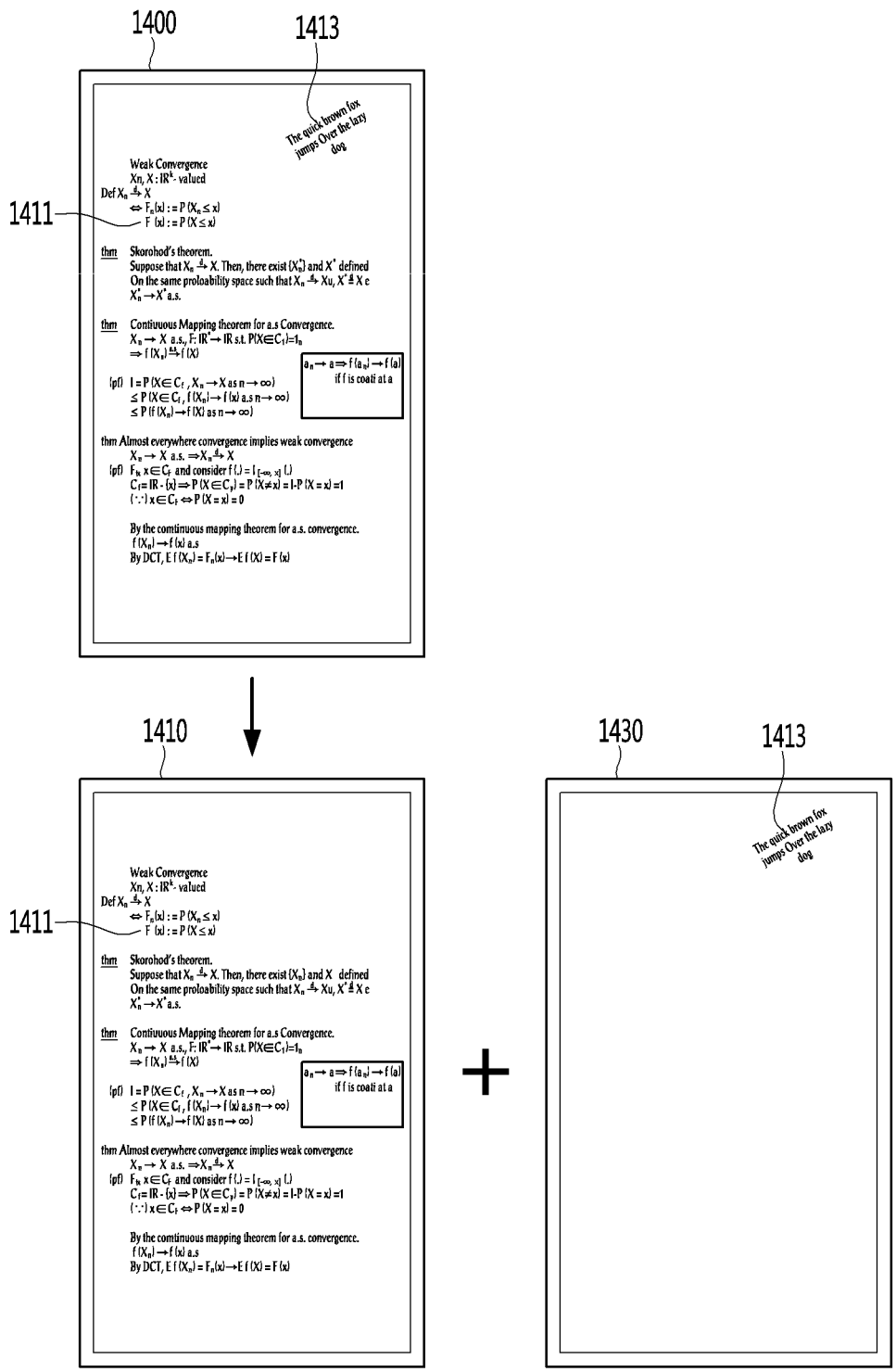
FIGS. 14 and 15 are views illustrating an example in which a writing is stored through a separate layer based on an attribute created through the pen device according to an embodiment.
Figure 15:
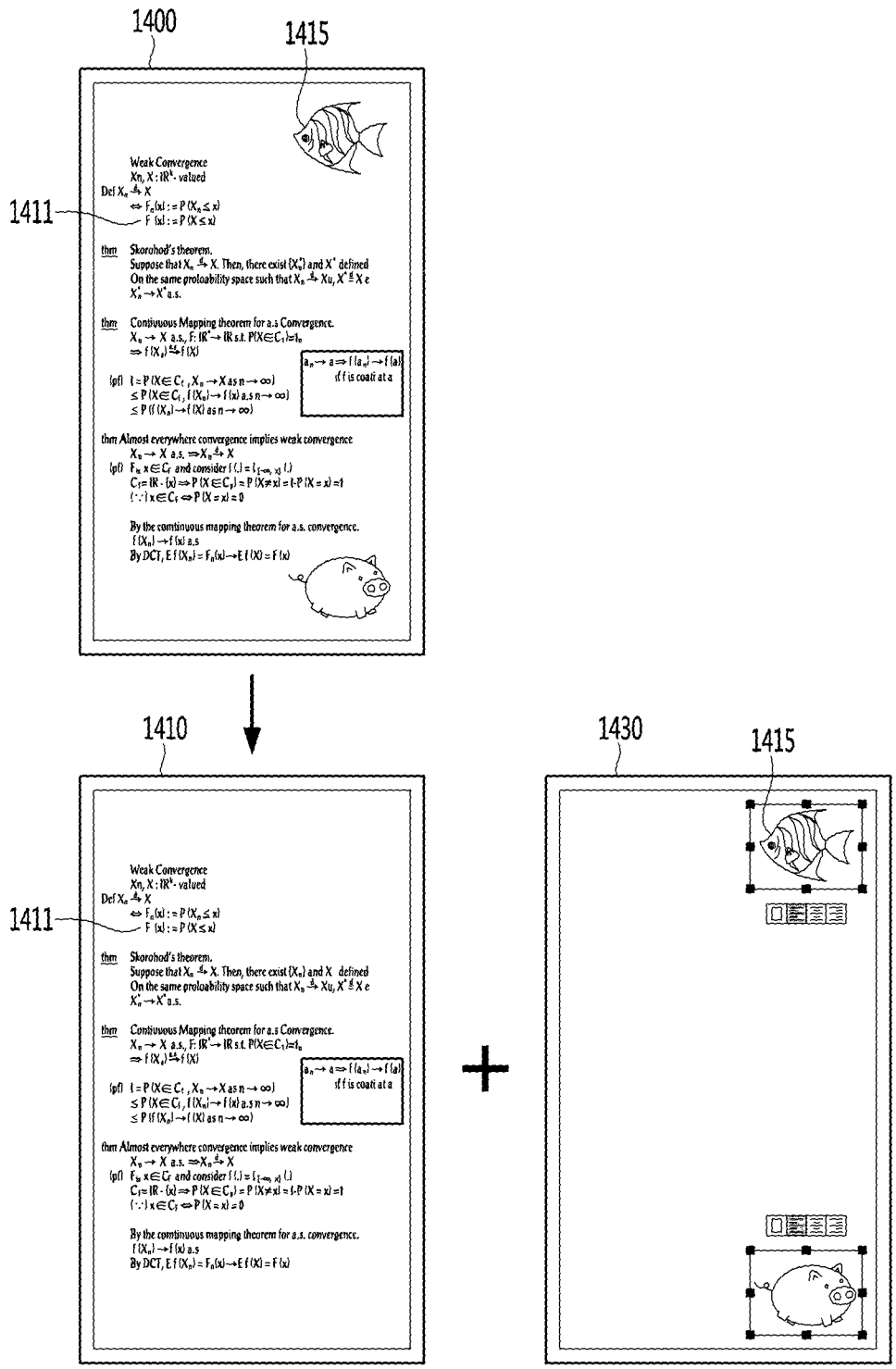

FIGS. 14 and 15 are views illustrating an example in which a writing is stored through a separate layer based on an attribute created through the pen device according to an embodiment.

Referring to FIG. 14, a writing window 1400 displayed through the display unit 151 may include a first writing area 1411 and a second writing area 1413. A writing color and a writing style of the first writing area 1411 may be different from those of the second writing area 1413.

The controller 180 may store the first writing area 1411 in a first layer window 1410 and store the second writing area 1413 in a second layer window 1430. The user can use the layer windows to be distinguished from each other, and perform edition such as deletion or combination, if necessary.

Referring to FIG. 15, the writing window 1400 displayed through the display unit 151 may include the first writing area 1411 and a third writing area 1415. The first writing area 1411 may include only texts, and the third writing area 1415 may include a drawing.

The controller 180 may store the first writing area 1411 in the first layer window 1410 and store the third writing area 1415 in the second layer window 1430.

FIG. 16 is a view illustrating an example in which a writing is corrected by detecting a situation in which it is difficult to create the writing through the pen device according to an embodiment.

Referring to FIG. 16, the display unit 151 of the mobile terminal 100 may display a writing input by the pen device 200 through a first layer 1610.

In this state, if a contact between the pen device 200 and the display unit 151 is not detected for a predetermined time, and a voice is input through the microphone 122, the controller 180 may produce a second layer 1630. The second layer 1630 may be a layer for correcting overlapping of a writing displayed on the first layer 1610 with another writing. That is, the another writing may be added on the second layer 1630, and the display unit 151 may display the writing displayed on the first layer 1610 and the another writing displayed on the second layer 1630 not to overlap with each other.

Figure 17:
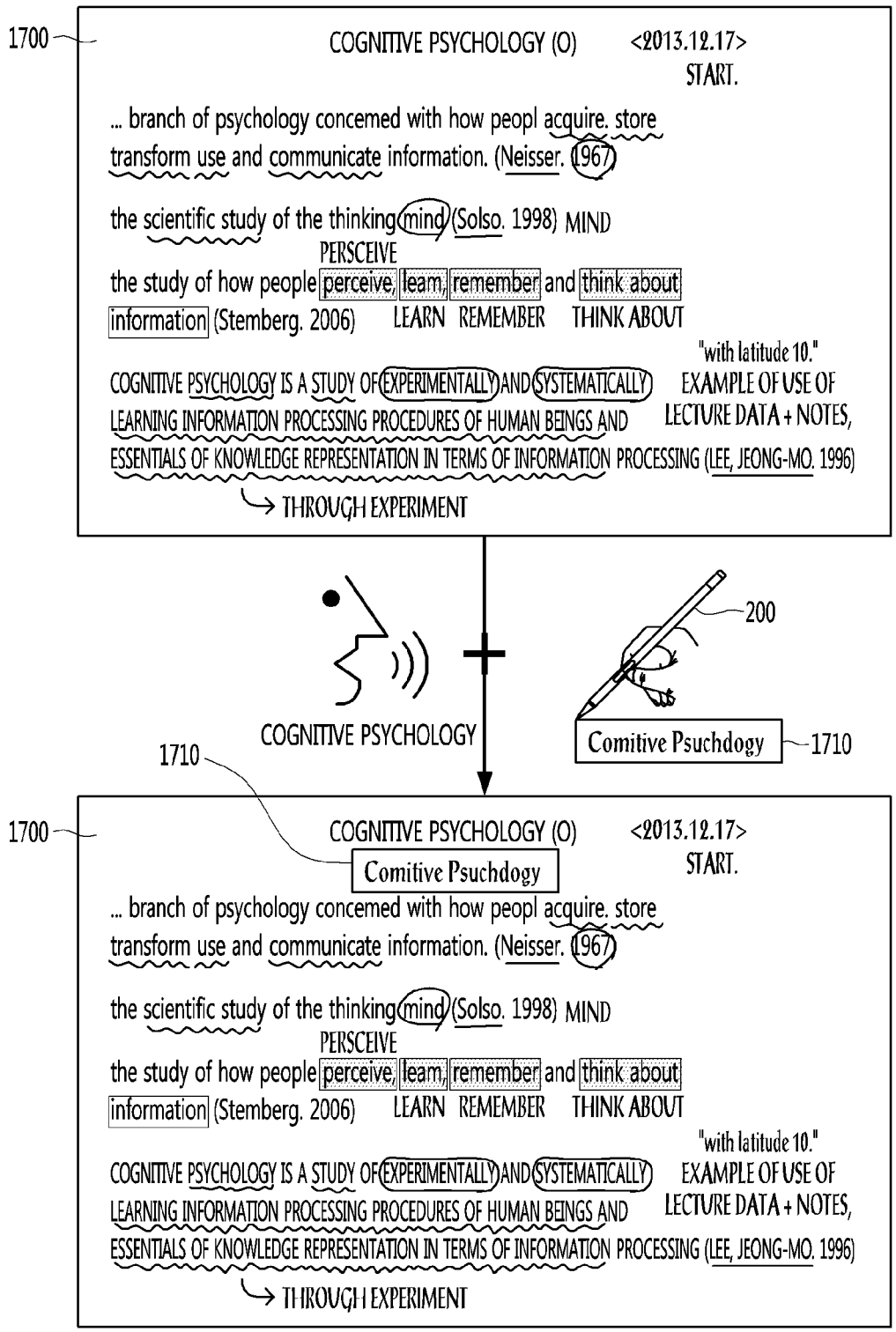
FIG. 17 is a view illustrating an example in which a writing created through the pen device is moved to a specific position, based on a voice of a user, according to an embodiment.

FIG. 17 is a view illustrating an example in which a writing created through the pen device is moved to a specific position, based on a voice of the user, according to an embodiment.

Referring to FIG. 17, the display unit 151 is displaying a lecture data window 1700. If a writing 1710 is created through the pen device 200, and a specific voice (definition of cognitive psychology) is recognized, the controller 180 may allow the created writing 1710 to be moved at a text position of the lecture data window 1700, which corresponds to the recognized voice.

The created writing 1710 may be input into the lecture data window 1700 displayed on the display unit 151 or may be input into an area except the display unit 151.

FIGS. 18 to 25 are views illustrating an example in which various functions are performed by operations of turning a wheel provided in the pen device according to various embodiments.

Figure 18:
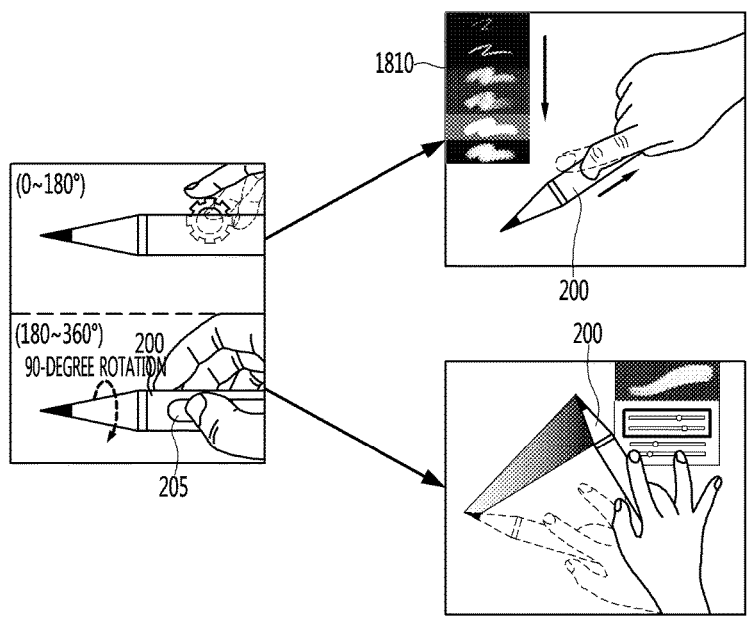
FIGS. 18 to 25 are views illustrating an example in which various functions are performed by operations of turning a wheel provided in the pen device according to various embodiments.

Referring to FIG. 18, the pen device 200 may have a wheel 205 provided in a body thereof. The wheel 205 may be manipulated through a finger of the user. Particularly, the wheel 205 may be manipulated through an index finger or thumb of the user.

If the wheel 205 is located in a direction opposite to that in which gravity acts, the controller 290 of the pen device 200 may detect that the wheel 205 is manipulated by the index finger.

If the wheel 205 is rotated by 90 degrees in the direction opposite to that in which gravity acts, the controller 290 of the pen device 200 may detect that the wheel 205 is manipulated by the thumb.

The controller 290 of the pen device 200 may detect a direction in which the wheel 205 is located through the gyro sensor provided therein, and transmit the detected result to the mobile terminal 100.

It is assumed that a state in which the wheel 205 is manipulated by the index finger is a first manipulation state, and a state in which the wheel 205 is manipulated by the thumb is a second manipulation state.

The controller 180 of the mobile terminal 100 may change a brush type in the first manipulation state. That is, if the wheel 205 is turned in the first manipulation state, the controller 180 may change the brush type of the pen device 200. That the brush type is changed as the wheel 205 is turned may be displayed a brush type window 1810.

The controller 180 of the mobile terminal 100 may change an attribute of a writing in the second manipulation state. That is, if the wheel 205 is turned in the second manipulation state, any one of the size, brightness, and chroma of the writing may be adjusted.

Next, FIG. 19 will be described.

Figure 19:
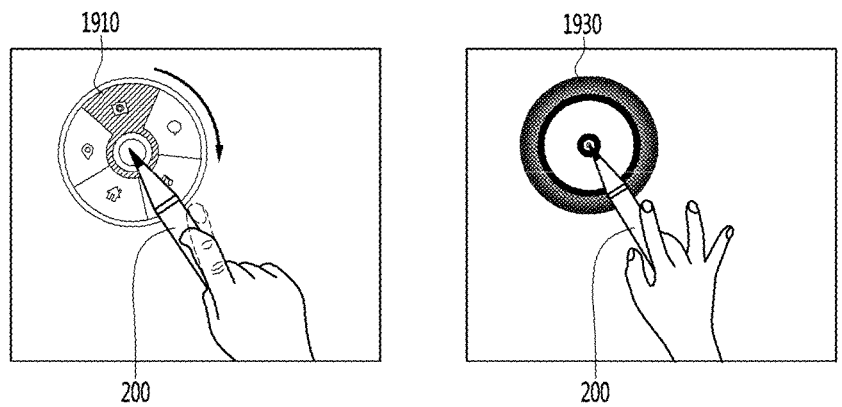

Referring to FIG. 19, if the nib of the pen device 200 is in contact with the display unit 151, and the pen device 200 is in the first manipulation state, the controller 180 of the mobile terminal 100 may display a brush type change window 1910 representing that the brush type is changed.

On the contrary, if the nib of the pen device 200 is in contact with the display unit 151, and the pen device 200 is in the second manipulation state, the controller 180 of the mobile terminal 100 may display a writing attribute change window 1930 representing that any one of the size, brightness, and chroma of the writing is changed.

Next, FIG. 20 will be described.

Figure 20:
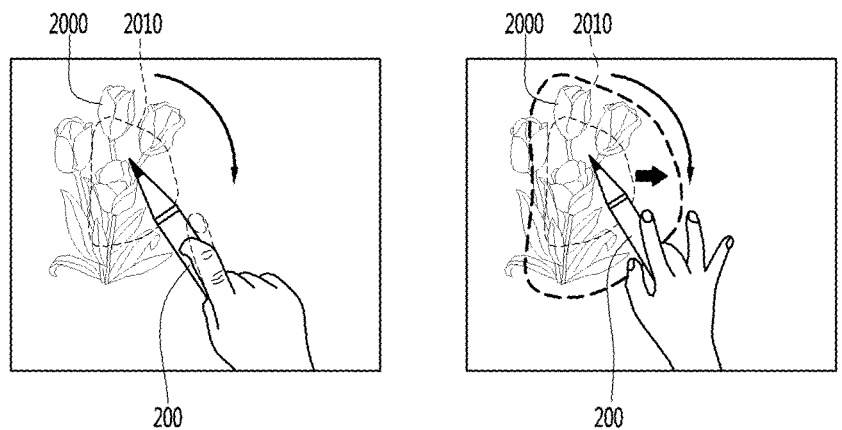

Referring to FIG. 20, the display 151 displays an image 2000, and the pen device 200 is in the first manipulation state. In addition, a specific area 2010 is specified on the image 2000 through the pen device 200. In this state, if an input for turning the wheel 205 is detected, the mobile terminal 100 may change the shape of the specific area 2010. For example, the mobile terminal 100 may change the shape of the specific area 2010 from a quadrangle to a circle.

Meanwhile, if the pen device 200 is in the second manipulation state, and an input for turning the wheel 205 is detected, the mobile terminal 100 may enlarge or reduce the size of the specific area 2010.

Next, FIG. 21 will be described.

Figure 21:
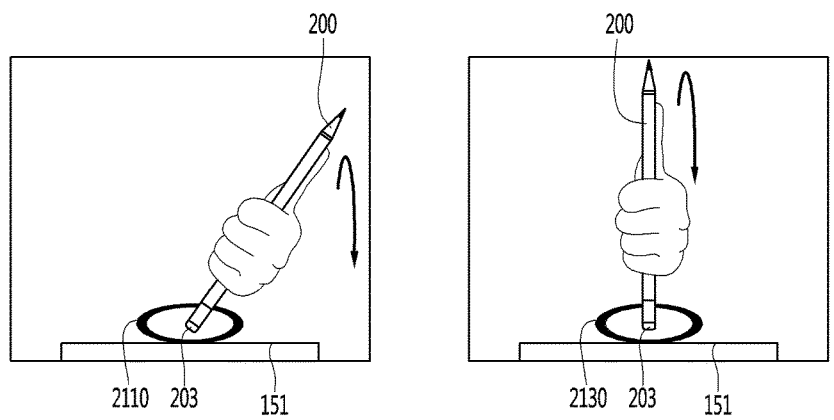

FIG. 21 illustrates an example in which, if the tip 203 of the pen device 200 is in contact with the display unit 151, and the pen device 200 is in the second manipulation state, the operation mode of the pen device 200 is changed depending on an angle between the pen device 200 and the display unit 151.

If the angle between the pen device 200 and the display unit 151 is within the second angle range, the mobile terminal 100 may detect that the pen device 200 operates in an eraser mode. The eraser mode is the same as described in FIG. 7. In this case, the size of an eraser area 2110 in which a writing is erasable may be adjusted as the wheel 205 is turned.

If the angle between the pen device 200 and the display unit 151 is within the first angle range, the mobile terminal 100 may detect that the pen device 200 operates in a memorization write mode. The memorization write mode is the same as described in FIG. 7. In this case, the size of a black box 2130 capable of covering a writing may be adjusted as the wheel 205 is turned.

Next, FIG. 22 will be described.

Figure 22:
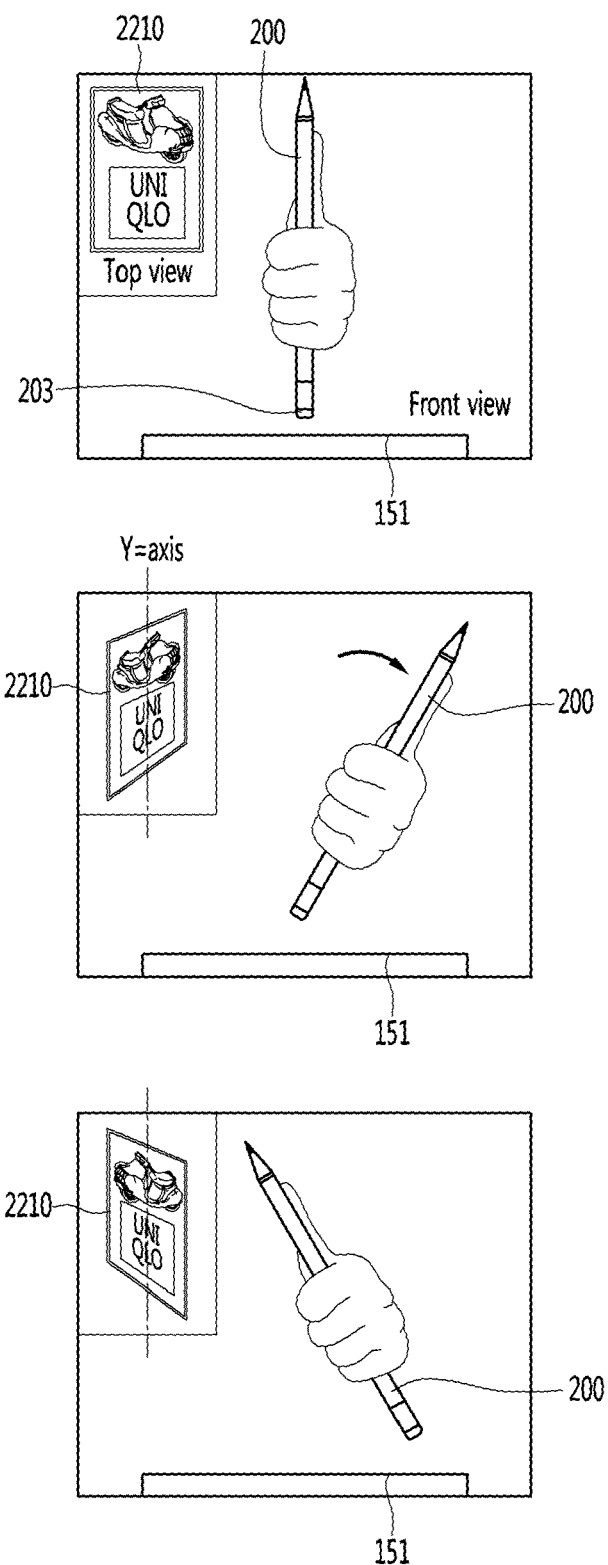

Referring to FIG. 22, the display unit 151 of the mobile terminal 100 is displaying an image 2210. In a state in which the image 2210 is selected, the pen device 200 may be disposed to be spaced apart from the display unit 151 at a predetermined distance. Specifically, the tip 203 of the pen device 200 may be vertically disposed toward the display unit 151.

If the pen device 200 is inclined to a specific axis, the mobile terminal 100 may rotate the image 2210, corresponding to the axis to which the pen device 200 is inclined.

Figure 23:
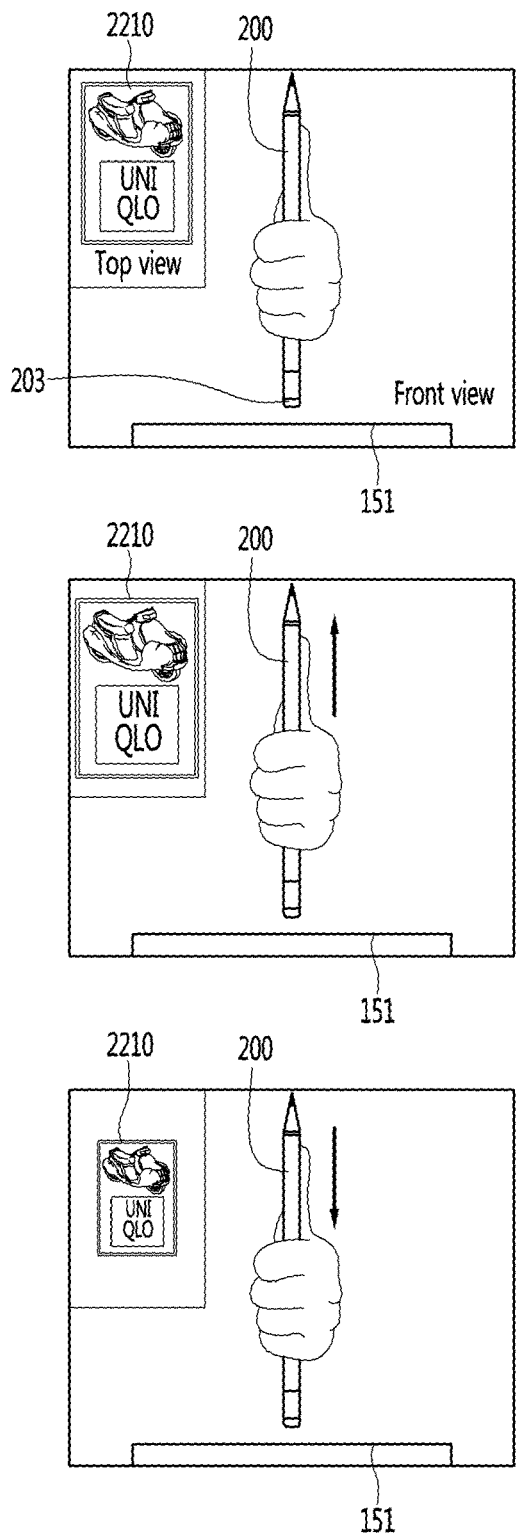

Referring to FIG. 23, in the state in which the image 2210 is selected, the pen device 200 may be disposed to be spaced apart from the display unit 151 at a predetermined distance.

If the wheel 205 of the pen device 200 is turned upwardly, the image 2210 may be enlarged. If the wheel 205 of the pen device 200 is turned downwardly, the image 2210 may be reduced.

Figure 24:
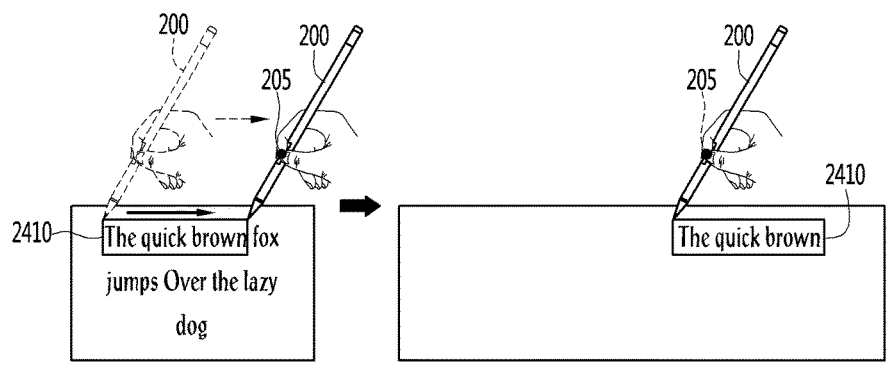

Next, FIG. 24 will be described.

The mobile terminal 100 is displaying writing information. If the pen device 200 is in the first manipulation state, and a partial writing 2410 included in the writing information is selected through the pen device 200, the pen device 200 or the mobile terminal 100 may copy the partial writing 2410. If the wheel 205 is selected at another point of the display unit 151, the mobile terminal 100 may display the copied partial writing 2410.

Meanwhile, if the pen device 200 is in the first manipulation state, and the partial writing 2410 included in the writing information is selected through the pen device 200, the mobile terminal 100 may delete the partial writing 2410.

Figure 25:
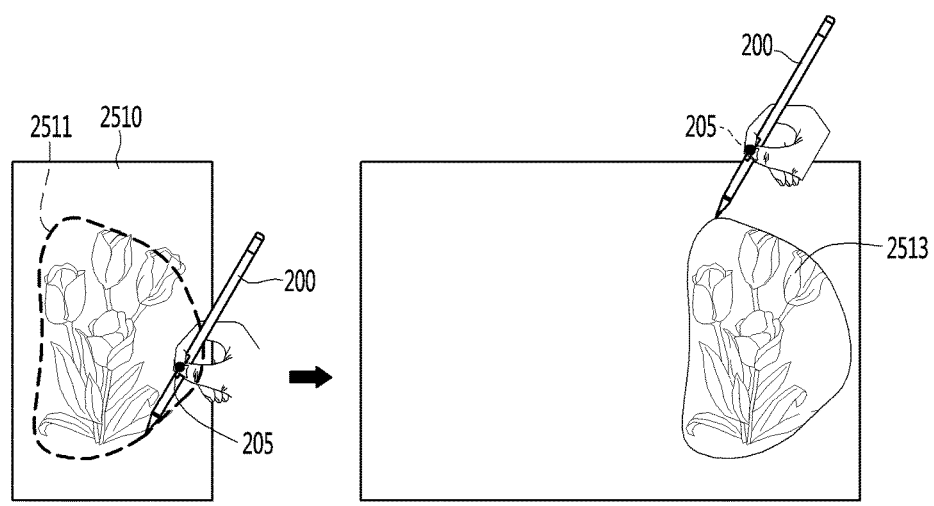

Next, FIG. 25 will be described.

The mobile terminal 100 is displaying an image 2510. If the pen device 200 is in the first manipulation state, and a specific area 2511 of the image 2510 is drawn through the pen device 200, the pen device 200 or the mobile terminal 100 may copy a partial image corresponding to the specific area 2511. If the wheel 205 is selected at another point of the display unit 151, the mobile terminal 100 may display the copied partial image 2513.

If the pen device 200 is in the second manipulation state, and the specific area 2511 of the image 2510 is drawn through the pen device 200, the mobile terminal 100 may delete a partial image corresponding to the specific area 2511.

Next, an example in which an operation of the pen device 200 is changed based on a pressure applied to the pen device 200 according to another embodiment will be described.

FIGS. 26 to 30 are views illustrating an example in which a function of the pen device 200 is changed based on a pressure applied to the pen device 200 according to various embodiments.

In FIGS. 26 to 30, the pen device 200 may include one or more pressure sensors (not shown). The one or more pressure sensor may be provided in a body of the pen device 200. Each pressure sensor may detect an intensity of a pressure applied to the body through a finger of the user. The sensed intensity of the pressure may be transmitted to the mobile terminal 100.

In another embodiment, if a touch sensor detects that the nib 201 is touched on the display unit 151, the mobile terminal 100 may detect an intensity of a pressure applied through the touch.

Hereinafter, the intensity of the pressure, sensed through the pressure sensor of the pen device 200 will be mainly described, but the present disclosure is not limited thereto. That is, the intensity of the pressure detected through the touch sensor, may be used instead of the intensity of the pressure, sensed through the pressure sensor.

Figure 26:
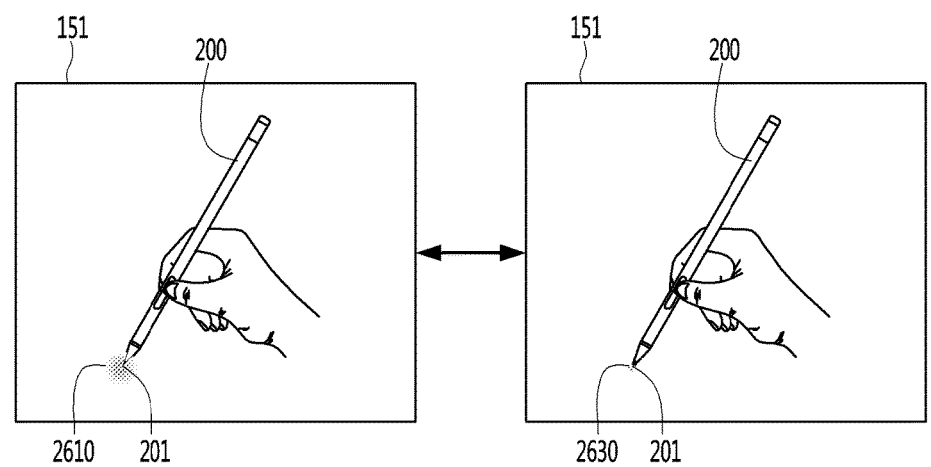
FIGS. 26 to 30 are views illustrating an example in which a function of the pen device 200 is changed based on a pressure applied to the pen device 200 according to various embodiments.

Referring to FIG. 26, the nib 201 of the pen device 200 is in a state in which it is in contact with the display unit 151 of the mobile terminal 100. As the intensity of the pressure detected through the pressure sensor of the pen device 200 increases, the size of an ink shape 2610 displayed at a position of the display unit 151 with which the nib 201 is in contact may increase. On the contrary, as the intensity of the pressure detected through the pressure sensor of the pen device 200 decreases, the size of an ink shape 2630 displayed at a position of the display unit 151 with which the nib 201 is in contact may decrease.

Figure 27:
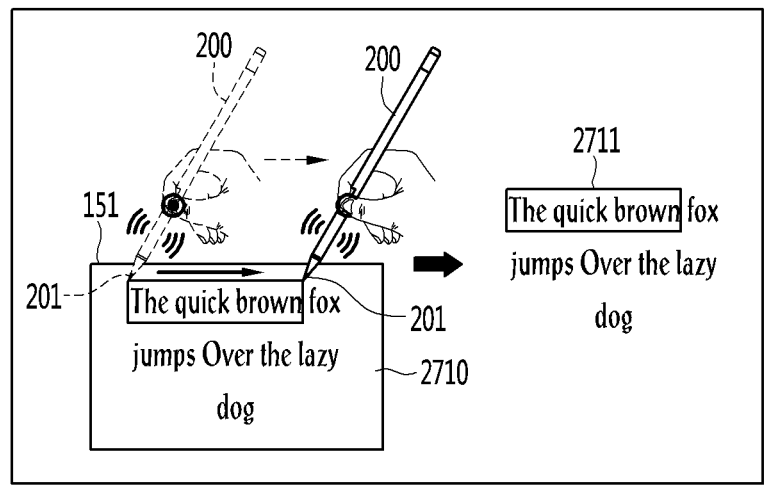

Referring to FIG. 27, the display unit 151 of the mobile terminal 100 is displaying a sentence 2710 including texts. If an intensity of a pressure detected through the pressure sensor of the pen device 200 is equal to or greater than a reference intensity, and a portion of the sentence 2710 is dragged through the nib 201, the mobile terminal 100 may thickly display the dragged portion 2711 of the sentence.

Figure 28:
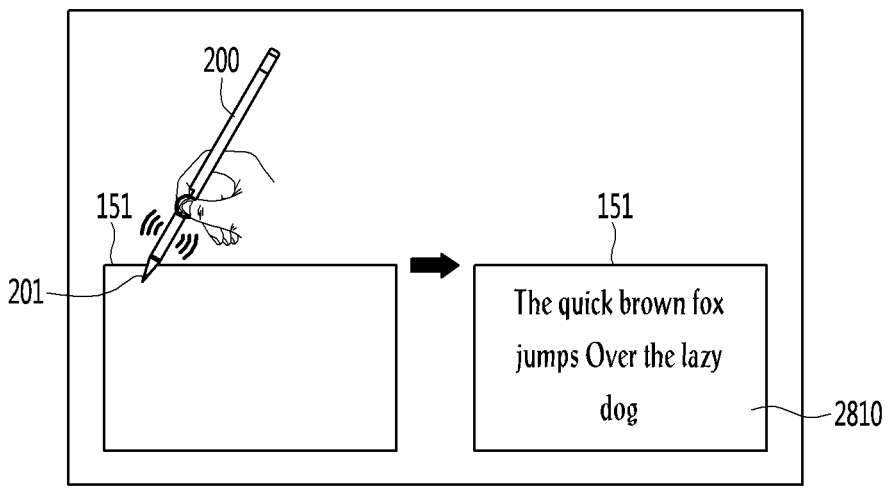

Referring to FIG. 28, the display unit 151 of the mobile terminal 100 does not display any information. If the intensity of the pressure detected through the pressure sensor of the pen device 200 is equal to or greater than the reference intensity, and a sentence 2810 is created through the nib 201, the mobile terminal 100 may thickly display the created sentence 2810.

Figure 29:
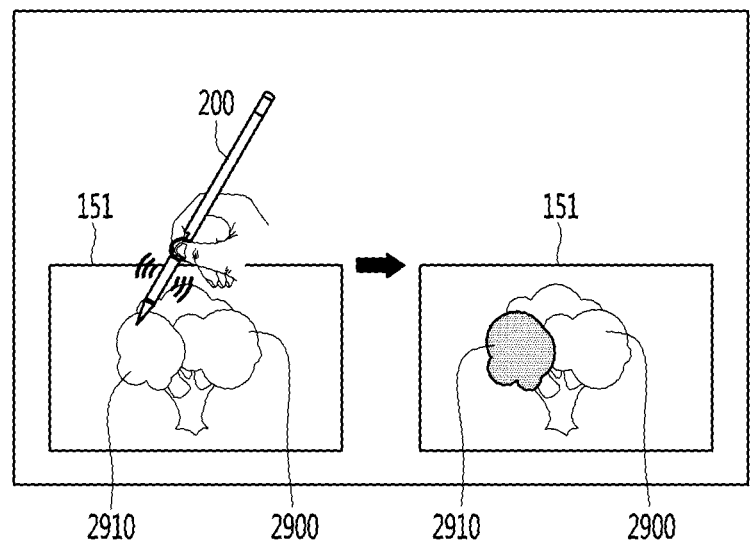

Referring to FIG. 29, the display unit 151 of the mobile terminal 100 may display an image 2900. The image 2900 may include a plurality of areas. If the intensity of the pressure detected through the pressure sensor of the pen device 200 is equal to or greater than the reference intensity, and an area 2910 among the plurality of areas included n the image 2900 is selected through the nib 201, the mobile terminal 100 may clearly display the selected area 2910.

Figure 30:
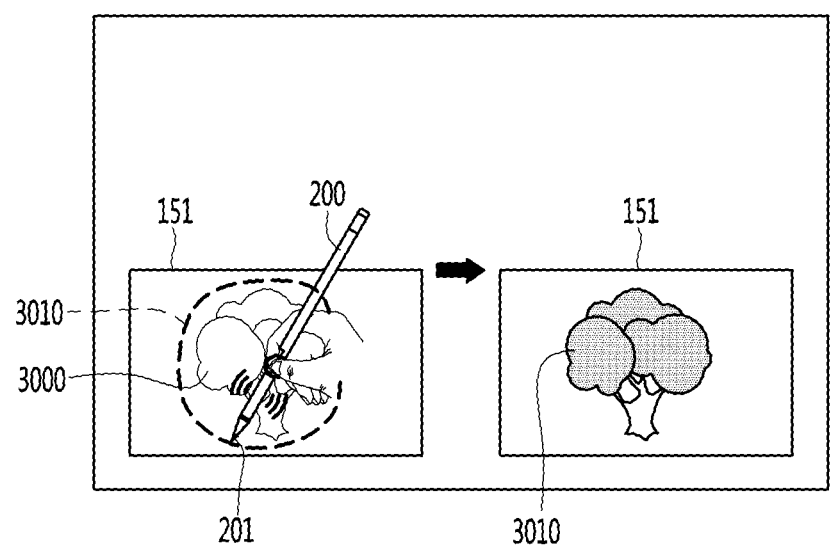

Referring to FIG. 30, the display unit 151 of the mobile terminal 100 may display an image 3000. If the intensity of the pressure detected through the pressure sensor of the pen device 200 is equal to or greater than the reference intensity, and an area specification input for surrounding the image 3000 is received through the nib 201, the mobile terminal 100 may clearly display the image 3000 in an area 3010 displayed based on the received area specification input.

Figure 31:
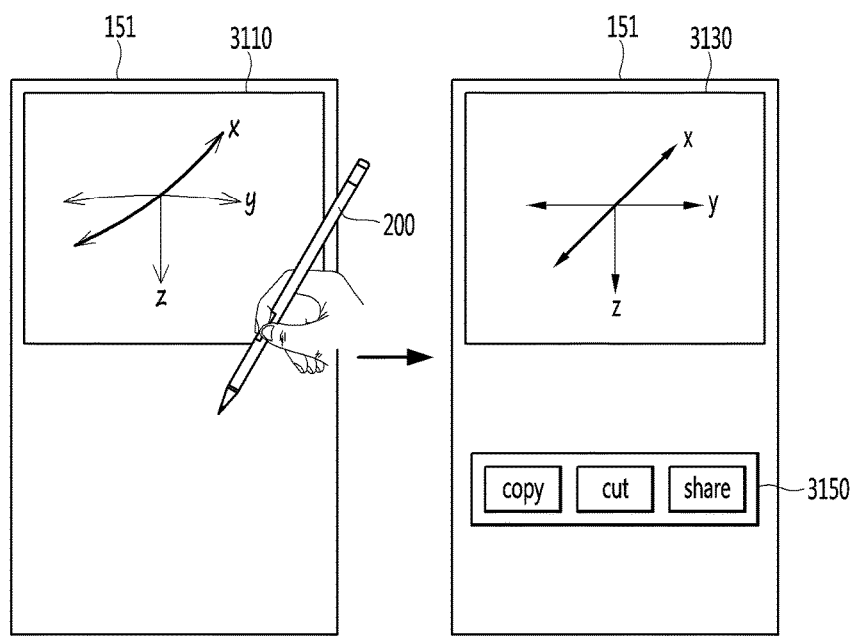
FIG. 31 is a view illustrating an example in which the operation mode of the mobile terminal is changed depending on a distance between the display unit of the mobile terminal and the pen device according to an embodiment.

FIG. 31 is a view illustrating an example in which the operation mode of the mobile terminal is changed depending on a distance between the display unit of the mobile terminal and the pen device according to an embodiment.

The controller 180 of the mobile terminal 100 may acquire a distance between the front surface of the display unit 151, on which information is displayed, and the pen device 200. The controller 180 may acquire the distance between the front surface of the display unit 151 and the pen device 200 through a distance sensor.

If the distance between the front surface of the display unit 151 and the pen device 200 is within a predetermined distance, the controller 180 of the mobile terminal 100 may set the operation mode of the mobile terminal to a writing mode. The predetermined distance may be 50 cm, but this is merely an example. That is, that the distance between the front surface of the display unit 151 and the pen device 200 is within the predetermined distance may include even a case where the front surface of the display unit 151 and the nib of the pen device 200 are in contact with each other.

In an embodiment, the writing mode may be a mode in which an input such as a text or drawing is possible through the pen device 200.

If the distance between the front surface of the display unit 151 and the pen device 200 exceeds the predetermined distance, the controller 180 of the mobile terminal 100 may set the operation mode of the mobile terminal 100 to a viewing mode.

In an embodiment, the viewing mode may be a mode for editing and watching writing information created through the pen device 200.

Referring to FIG. 31, the display unit 151 of the mobile terminal 100 may display writing information 3110 input through pen device 200 under the writing mode.

In this state, if the operation mode of the mobile terminal 100 is changed from the writing mode to the viewing mode, the controller 180 may display corrected writing information 3130 and an edition menu 3150 for editing the corrected writing information 3130.

The corrected writing information 3130 may be information in a form in which a writing is corrected such as a form in which an input line is corrected as a straight line.

As the operation mode of the mobile terminal 100 is rapidly changed, the user can edit a writing while performing the writing.

Figure 32:
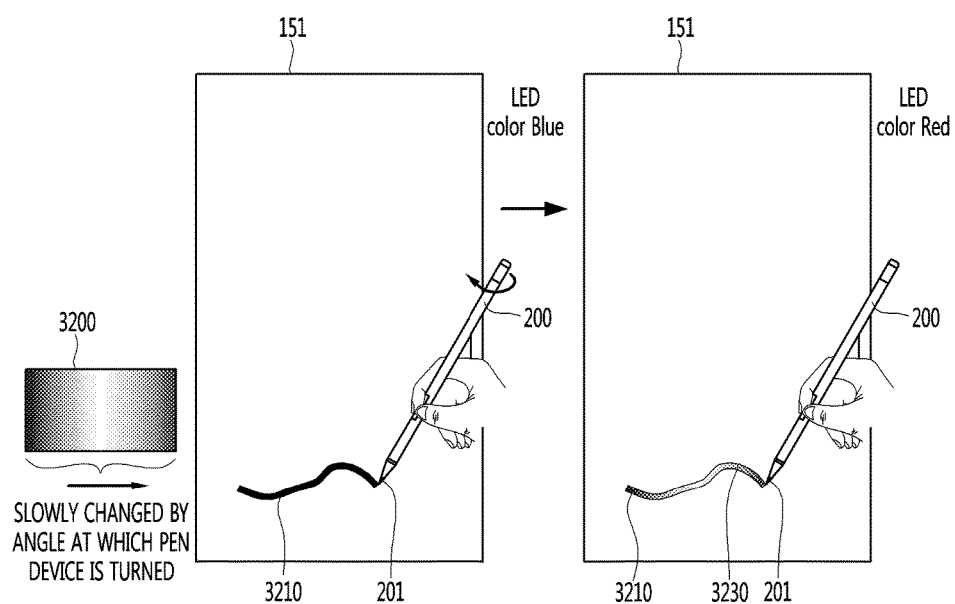
FIG. 32 is view illustrating an example in which, if the pen device is turned in a state in which the pen device is grasped by fingers of the user, a color of an input writing is changed according to an embodiment.

FIG. 32 is view illustrating an example in which, if the pen device is turned in a state in which the pen device is grasped by fingers of the user, a color of an input writing is changed according to an embodiment.

Referring to FIG. 32, a line 3210 having a first color, which is input through the pen device 200, is displayed on the display unit 151. It is assumed that the nib 201 of the pen device 200 is in contact with the display unit 151. In this state, if the pen device 200 is turned by a predetermined angle, the mobile terminal 100 may change the line 3210 having the first color to a line 3230 having a second color. In addition, a gradation guide 3200 representing that a color can be changed as the pen device 200 is turned may be displayed.

In FIG. 32, a case where a color is changed has been described as an example, but the present disclosure is not limited thereto. That is, a thickness, transparency, brightness, chroma, etc. may be changed.

FIG. 33 is a view illustrating an example in which, if one surface of the pen device is in contact with the display unit, the pen device operates in an eraser mode according to an embodiment.

Referring to FIG. 33, the display unit 151 of the mobile terminal 100 is displaying a writing 3310 input through the pen device 200. In this state, as the pen device 200 is laid on the display unit 151, one surface of the pen device 200 may be in contact with the display unit 151. The gyro sensor provided in the pen device 200 may detect the contact. In this case, the pen device 200 may perform an eraser function of erasing the writing by an area of the pen device 200 that is in contact with the display unit 151.

As the pen device 200 moves, a portion of the writing 3310 is erased, and therefore, only the remaining writing 3311 may be displayed on the display unit 151.

Figure 34:
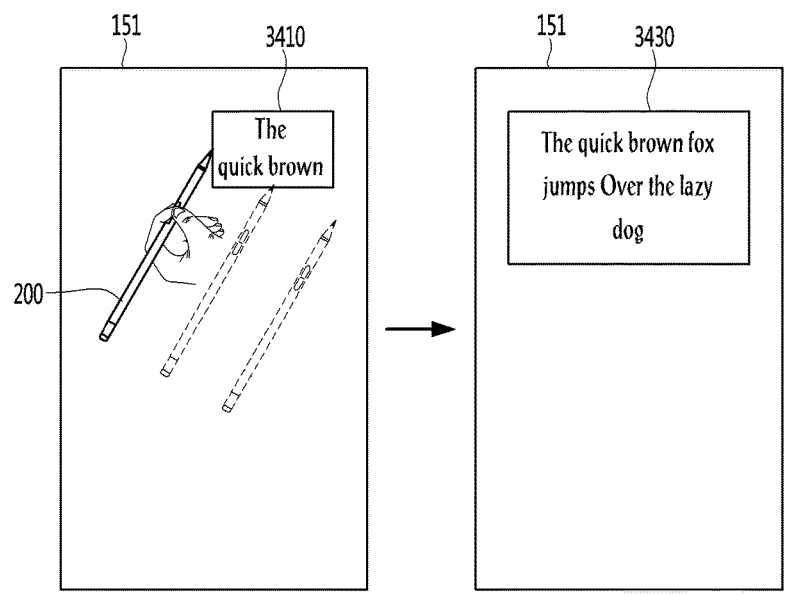
FIG. 34 is a view illustrating an example in which writing information corrected based on a hand of the user, which grasps the pen device, is provided according to an embodiment.

FIG. 34 is a view illustrating an example in which writing information corrected based on a hand of the user, which grasps the pen device, is provided according to an embodiment.

Referring to FIG. 34, the display unit 151 is displaying writing information 3410 created as the pen device 200 is grasped by a left hand of the user. The pen device 200 may determine whether the pen device 200 is grasped by a right or left hand of the user through the gyro sensor or angle sensor.

As the writing information 3410 is created by the left hand, a writing may not be properly aligned.

The mobile terminal 100 may display corrected writing information 3430, based on drawing information of the user, received from the pen device 200. The drawing information of the user may include information representing by which hand the writing is input as the pen device 200 is grasped.

In addition, the mobile terminal 100 may provide a menu related to the writing in a form suitable for the left hand, based on the drawing information of the user.

Figure 35:
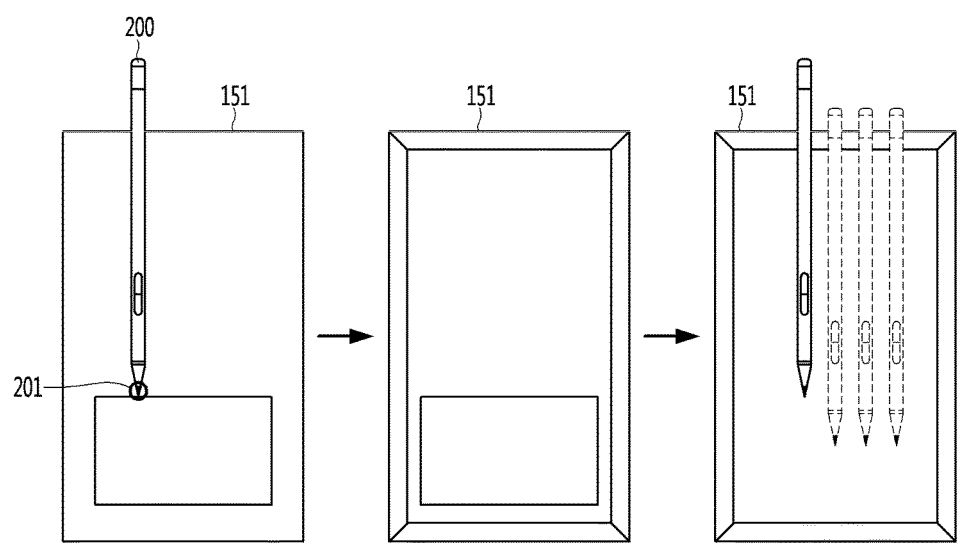
FIG. 35 is a view illustrating an example in which a screen in a braille mode is provided based on an arrangement between the pen device and the mobile terminal according to an embodiment.

FIG. 35 is a view illustrating an example in which a screen in a braille mode is provided based on an arrangement between the pen device and the mobile terminal according to an embodiment.

Referring to FIG. 35, the mobile terminal 100 may detect that the nib 201 of the pen device 200 vertically disposed on the display unit 151 is in contact with the display unit 151 for a predetermined time. In this case, the mobile terminal 100 may change a screen of the display unit 151 to a screen in the braille mode. The screen in the braille mode may be a screen in a mode for inputting concave and convex-shaped brailles through the nib 201.

As the nib 201 and the display unit 151 are in contact with each other, brailles may be input on the screen in the braille mode.

Figure 36:
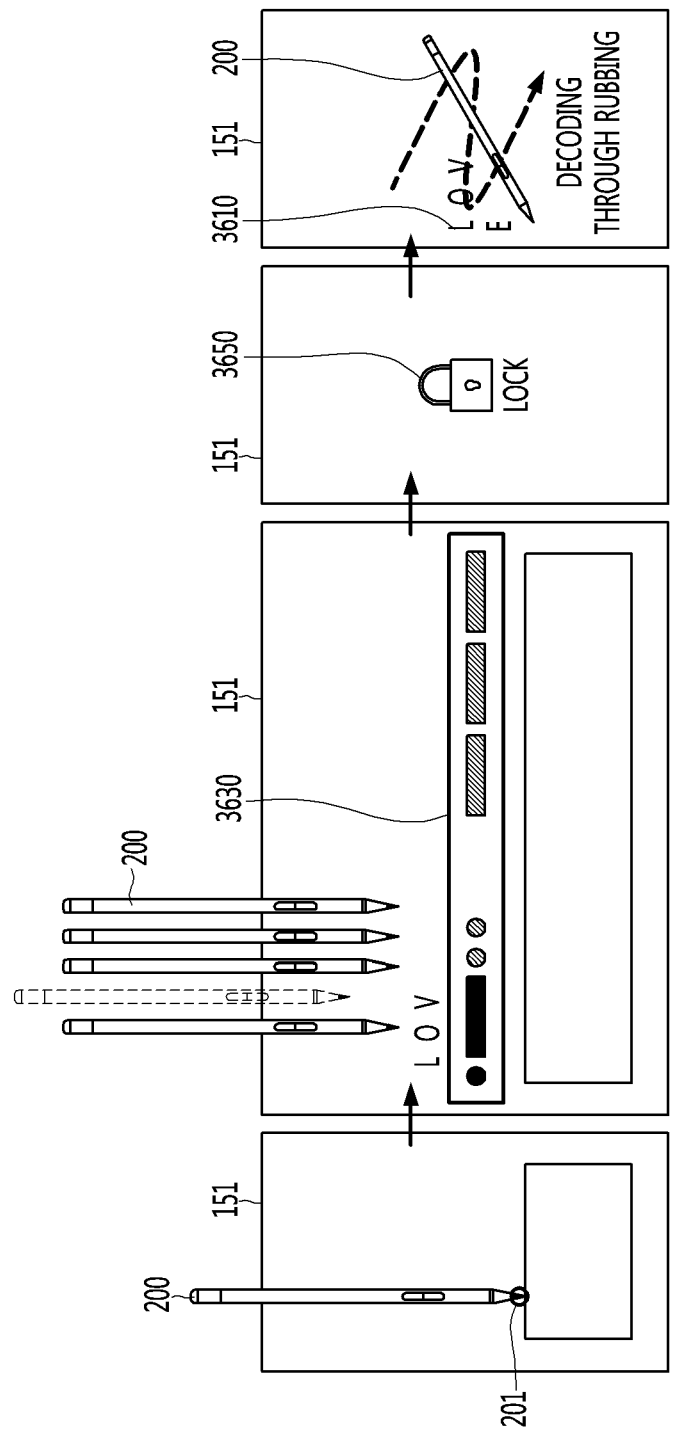
FIG. 36 is a view illustrating a process of encoding a writing, based on an arrangement between the pen device and the mobile terminal, according to an embodiment.

FIG. 36 is a view illustrating a process of encoding a writing, based on an arrangement between the pen device and the mobile terminal, according to an embodiment.

Referring to FIG. 36, the display unit 151 is displaying a writing 3610. If the nib 201 of the pen device 200 vertically disposed on the display unit 151 is in contact with the display unit 151 for a predetermined time, the mobile terminal 100 may display a Morse code 3630 corresponding to the writing 3610. If the predetermined time elapses, the mobile terminal 100 may display a lock icon 3650 representing that the writing 3610 has been encoded.

After that, if an input for rubbing the display unit 151 through the pen device 200 is detected, the mobile terminal 100 may display the encoded writing 3610 on the display unit 151.

Figure 37:
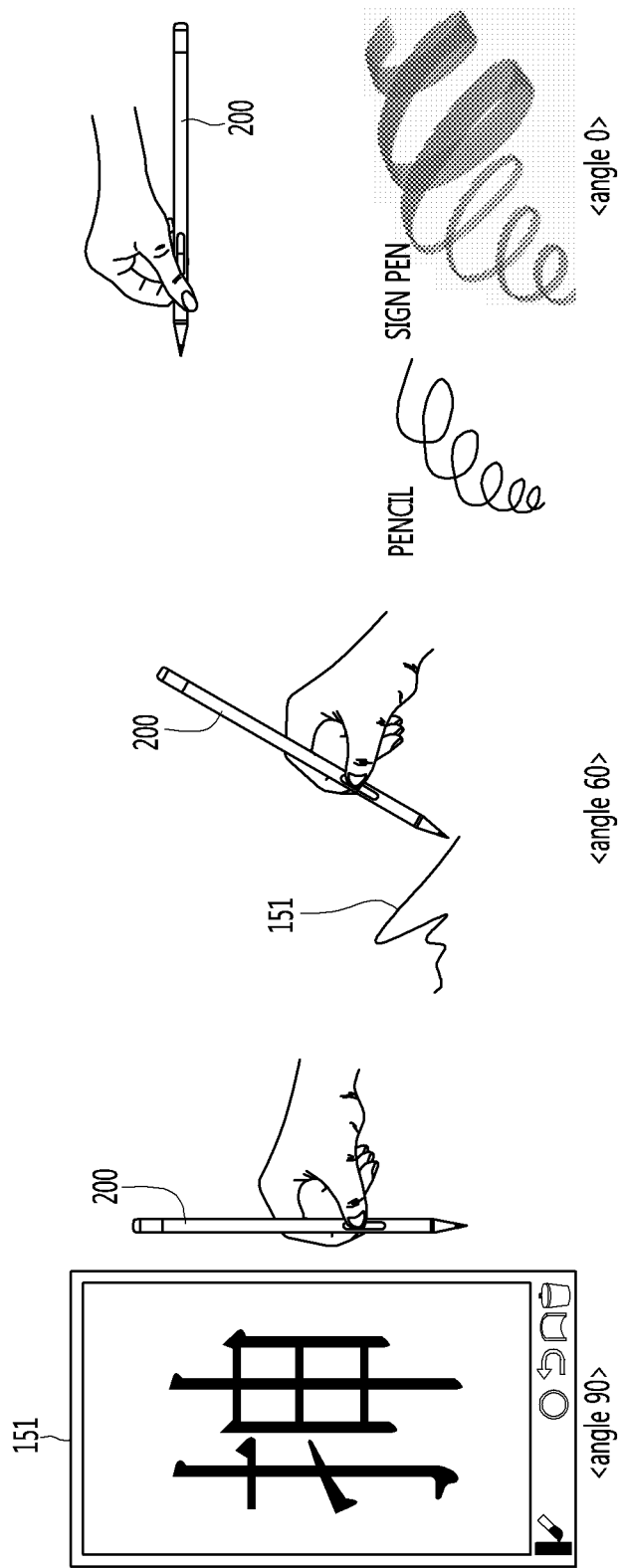
FIG. 37 is a view illustrating an example in which various writing modes are provided based on an angle made by the pen device and the mobile terminal according to an embodiment.

FIG. 37 is a view illustrating an example in which various writing modes are provided based on an angle made by the pen device and the mobile terminal according to an embodiment.

The pen device 200 and the display unit 151 of the mobile terminal 100 may form an angle of 90 degrees, 60 degrees, or 0 degree.

If the angle made between the pen device 200 and the display unit 151 is 90 degrees, a brush writing mode may be provided. That is, the mobile terminal 100 may display a writing input through the pen device 200 in a brush writing form under the brush writing mode.

If the angle made between the pen device 200 and the display unit 151 is 60 degrees, a general writing mode may be provided.

If the angle made between the pen device 200 and the display unit 151 is 0 degree, a drawing mode may be provided. That is, the mobile terminal 100 may display a writing input through the pen device 200 in a drawing form under the drawing mode.

The present disclosure mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a microphone;
a display;
a communication module configured to perform communication with a pen device having a first end and a second end; and
a controller configured to:
control the microphone, the display, and the communication module;
cause the display to display a window including specific text;
recognize that the pen device operates in a first mode when the first end of the pen device is not in contact with the display for a predetermined time;
recognize a specific voice received via the microphone while the window including the specific text is displayed in the first mode, the specific voice corresponding to the specific text; and
cause the display to display writing information at a position corresponding to the specific text in the window in response to the recognized specific voice when the writing information is generated by the pen device on a surface other than a surface of the display in the first mode.

2. The mobile terminal of claim 1, wherein, while the pen device operates in the first mode, the controller is further configured to:
cause the display to display a black screen; and
cause the display to display the writing information on the black screen.

3. The mobile terminal of claim 1, wherein the controller is further configured to cause the display to display the writing information in a post-it form when the first end is in contact with the display such that the writing information is displayed in at least one post-it area of the display.

4. The mobile terminal of claim 1, wherein the surface comprises a display area of another mobile terminal or any type of surface.

5. The mobile terminal of claim 1, wherein the controller is further configured to:
determine an angle between the pen device and the mobile terminal set by the pen device; and
detect a memorization write mode and an eraser mode of the pen device, which are included in the first mode, based on the determined angle.

6. The mobile terminal of claim 5, wherein:
the memorization write mode is a mode in which a portion of the displayed writing information is covered by the second end of the pen device when the angle is within a first angle range; and
the eraser mode is a mode in which the displayed writing information is erased by the second end of the pen device when the angle is within a second angle range.

7. The mobile terminal of claim 6, wherein the controller is further configured to:
recognize a touch applied by the second end of the pen device at a portion of the writing information; and
cause the display to display a black box at the touched portion in response to the touch.

8. The mobile terminal of claim 7, wherein the controller is further configured to delete the black box when a writing generated by the second end corresponds to the covered portion after the black box is touched by the second end of the pen device for a predetermined time.

9. The mobile terminal of claim 1, wherein the controller is further configured to change an attribute of a writing window displayed on the display based on a user pattern by a user of the pen device.

10. The mobile terminal of claim 1, wherein:
an operation mode of the pen device includes the first mode and a second mode;
the first mode is a mode for performing an operation except for a writing function of the pen device; and
the second mode is a mode in which a writing is input via the display by the first end of the pen device.

11. A method for operating a mobile terminal, the method comprising:
displaying a window including specific text on a display of the mobile terminal;
recognizing that a pen device operates in a first mode when a first end of the pen device is not in contact with the display for a predetermined time;
recognizing a specific voice received via a microphone while the window including the specific text is displayed in the first mode, the specific voice corresponding to the specific text; and
displaying writing information at a position corresponding to the specific text in the window in response to the recognized specific voice when the writing information is generated by the pen device on a surface other than a surface of the display in the first mode.

12. The method of claim 11, wherein when the pen device operates in the first mode, the method further comprises:
changing a screen of the display to a black screen; and
displaying the writing information on the black screen.

13. The method of claim 11, further comprising displaying the writing information in a post-it form when the first end is in contact with the display such that the writing information is displayed in at least one post-it area of the display.

14. The method of claim 11, wherein the surface comprises a display area of another mobile terminal or any type of surface.

15. The method of claim 11, further comprising:
determining an angle between the pen device and the mobile terminal set by the pen device; and
detecting a memorization write mode and an eraser mode of the pen device, which are included in the first mode, based on the determined angle.

16. The method of claim 15, wherein:
the memorization write mode is a mode in which a portion of the displayed writing information is covered by a second end of the pen device when the angle is within a first angle range; and
the eraser mode is a mode in which the displayed writing information is erased by the second end of the pen device when the angle is within a second angle range.

17. The method of claim 16, further comprising:
recognizing a touch applied by the second end of the pen device at a portion of the writing information; and
displaying a black box at the touched portion in response to the touch.

18. The method of claim 17, further comprising deleting the black box when a writing generated by the second end corresponds to the covered portion after the black box is touched by the second end of the pen device for a predetermined time.

19. The method of claim 11, further comprising changing an attribute of a writing window displayed on the display based on a user pattern by a user of the pen device.

20. The method of claim 11, wherein:
an operation mode of the pen device includes the first mode and a second mode;
the first mode is a mode for performing an operation except for a writing function of the pen device; and
the second mode is a mode in which a writing is input via the display by the first end of the pen device.

* * * * *